United States Patent
Takahashi et al.

(10) Patent No.: US 7,674,166 B2
(45) Date of Patent: Mar. 9, 2010

(54) SERVER DEVICE FOR NET GAME, NET GAME MANAGEMENT METHOD, NET GAME MANAGEMENT PROGRAM AND RECORDING MEDIUM WHICH STORES NET GAME MANAGEMENT PROGRAM

(75) Inventors: Hidehisa Takahashi, Amagasaki (JP); Tatsuya Ishikawa, Takarazuka (JP); Kazuhiro Namba, Amagasaki (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1066 days.

(21) Appl. No.: 10/157,667

(22) Filed: May 29, 2002

(65) Prior Publication Data

US 2002/0183115 A1    Dec. 5, 2002

(30) Foreign Application Priority Data

May 30, 2001    (JP)    ............................... 2001-162862

(51) Int. Cl.
*A63F 13/00*    (2006.01)
(52) U.S. Cl. .................................. 463/3; 463/4; 463/42
(58) Field of Classification Search ...................... 463/1, 463/40–42, 3, 4, 25; 700/90–93
See application file for complete search history.

(56) References Cited

U.S. PATENT DOCUMENTS

| | | | | |
|---|---|---|---|---|
| 5,359,510 A | * | 10/1994 | Sabaliauskas ................. | 700/91 |
| 5,954,332 A | * | 9/1999 | Mero et al. .................. | 273/236 |
| 6,119,229 A | | 9/2000 | Martinez et al. | |
| 6,343,990 B1 | * | 2/2002 | Rasmussen et al. ........... | 463/25 |
| 6,439,997 B1 | * | 8/2002 | Brasseur et al. ............... | 463/40 |
| 6,755,743 B1 | * | 6/2004 | Yamashita et al. ............ | 463/42 |
| 2002/0091564 A1 | * | 7/2002 | Geller .......................... | 705/12 |

FOREIGN PATENT DOCUMENTS

| | | |
|---|---|---|
| EP | 1 031 912 | 8/2000 |
| EP | 1 078 667 | 2/2001 |
| GB | 2 325 104 | 11/1998 |
| JP | 8-084857 | 4/1996 |
| JP | 11-057215 | 3/1999 |
| JP | 2001-120841 | 5/2001 |

(Continued)

OTHER PUBLICATIONS

Television Show: "Who Wants to be a Millionaire," original United States air date Aug. 16, 2005, http://www.millionairetv.com/.*

(Continued)

*Primary Examiner*—Dmitry Suhol
*Assistant Examiner*—Thomas H Henry
(74) *Attorney, Agent, or Firm*—Jordan and Hamburg LLP

(57) ABSTRACT

The present invention provides a server device for net games which can improve the excitement of watching net games. The lobby server 13 transmits the game watching information to watch a game which a user to be a player plays using the client computer 2A to the client computer 2B of another member to be a spectator of this game, and receives a message transmitted from the client computer 2B of one spectator, and transmits the received message to the client computer 2B of the other spectator.

11 Claims, 17 Drawing Sheets

FOREIGN PATENT DOCUMENTS

| | | |
|---|---|---|
| KR | 2000-0054783 | 9/2000 |
| KR | 2001-0015341 | 2/2001 |
| WO | WO 95/31061 | 11/1995 |
| WO | WO 97/19537 | 5/1997 |
| WO | WO-98/34697 | 8/1998 |
| WO | WO-98/51384 | 11/1998 |
| WO | WO 00/29084 | 5/2000 |

OTHER PUBLICATIONS

Ania Lichtarowicz, Virtual Kingdom richer than Bulgaria, Mar. 29, 2002, BBC News.*

* cited by examiner

SERVER DEVICE FOR NET GAME, NET GAME MANAGEMENT METHOD, NET GAME MANAGEMENT PROGRAM AND RECORDING MEDIUM WHICH STORES NET GAME MANAGEMENT PROGRAM

BACKGROUND OF THE INVENTION

1. Field of the Invention

The present invention relates to a server device for net games (or network games) which is communicably connected to a plurality of terminal devices used by users via a network for managing a game played in a game space by the users using the terminal devices, a network game management method, and a net game management program used for this device.

2. Description of the Related Art

Today as the Internet becomes popular and data transfer speeds increase, net games using server devices for net games (or network games), and terminal devices used by users, which are connected via the Internet, are commonly played. With such net games, various matching games, including sports and physical combat, are played.

In the case of the above mentioned matching games, an unspecified number of general users can participate in a game since the Internet is used. When unknown users match in this way, the capability of an opponent in a game is unknown, so unexpectedness is added to the progress of a game, and some excitement can be added to a game compared with normal games which use a standalone game machine, where a game is played with the game machine as the opponent.

In such a board game as Go and Chess, a game played by users to be the players is watched by other users so that not only the players but also the other spectators can enjoy the net game.

However, by merely watching a game played by the users to be players as mentioned above, users to be the spectators cannot communicate with one another, and the spectators cannot sufficiently receive the excitement of the games watched. In other words, in a net game, a plurality of users can watch the game of other users and enjoy the game without locational restriction, but the relationship among spectators remains as simply watching the same game. So even though there are a plurality of spectators, the spectators cannot interchange with one another by exchanging opinions about the game, which is the common subject of interest. Therefore, the excitement of watching a game based on the interchange of spectators cannot be given to the spectators, and the excitement of watching net games cannot be improved.

SUMMARY OF THE INVENTION

To solve the above problem, it is an object of the present invention to provide a server device for net games which can improve the excitement of watching net games, a net game management program, and a network management method using this device.

The present invention relates to a server device for net games which is communicably connected to a plurality of terminal devices used by users via a network for managing a game played in a game space by the users using the terminal devices, comprising game watching information transmitting means for transmitting game watching information to watch a game which users to be players play using the terminal devices to the terminal devices of at least two other users to be spectators of the game, and communicating means for receiving a message transmitted from the terminal device of one of the spectators and transmitting the received message to the terminal device of at least one other spectator.

According to the present invention described above, the server device for net games which is communicably connected to a plurality of terminal devices used by users via a network for managing a game played in a game space by the users using the terminal devices, comprises game watching information transmitting means for transmitting game watching information to watch a game which users to be players play using the terminal devices to the terminal devices of at least two other users to be spectators of the game, and communicating means for receiving a message transmitted from the terminal device of one of the spectators and transmitting the received message to the terminal device of at least one other spectator.

In other words, in a net game, game watching information to watch a game which users to be players are playing using the terminal devices is transmitted to the terminal devices of at least two other users to be spectators of this game, so the spectators can receive the transmitted game watching information using the terminal devices, and can watch the game which the users to be players are playing using the terminal devices. Also, a message transmitted from the terminal device of one of the spectators is received, and the received message is transmitted to the terminal device of at least one other spectator, so messages can be exchanged among spectators while watching a game. Since the spectators can exchange opinions and criticisms on the currently watched game as messages, the excitement of watching games based on the interchange of spectators can be given to the spectators.

These and other objects, features, and advantages of the present invention will become more apparent upon reading the following detailed description along with the accompanying drawings.

DESCRIPTION OF THE PREFERRED EMBODIMENTS

Figure 1:
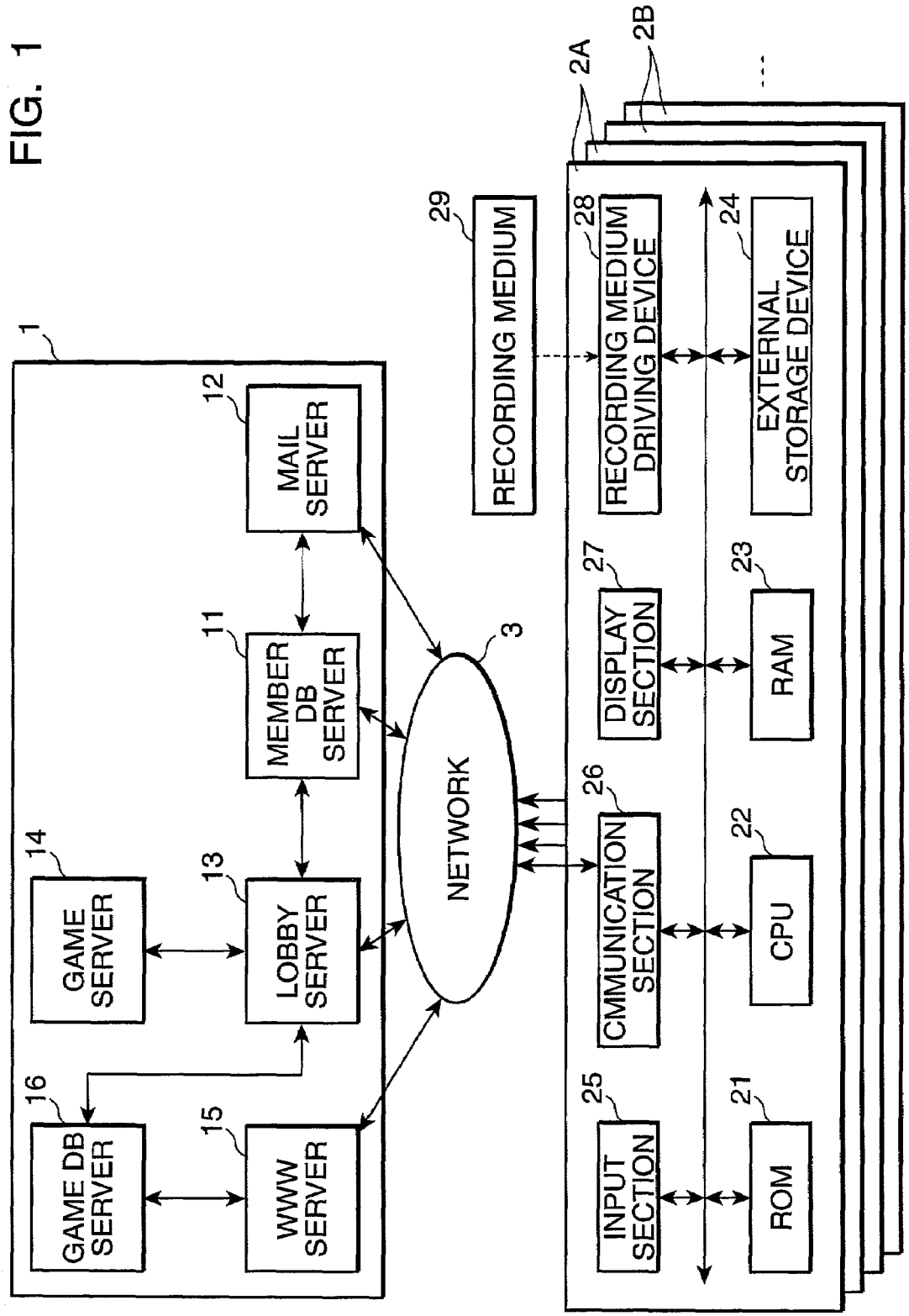
FIG. 1 is a block diagram depicting a configuration of the net game system using the server system according to an embodiment of the present invention.

A net game system using a server system according to an embodiment of the present invention will now be described with reference to the accompanying drawings. FIG. 1 is a block diagram depicting a configuration of a net game system using the server system according to an embodiment of the present invention.

In the following description, a baseball game when pre-registered members play games is described as an example of a net game, but the present invention is not limited by this example, but can be applied to various net games played between users, and can be suitably used for such games as other sports games, combat games, simulation games, shooting games and role playing games.

The net game system shown in FIG. 1 comprises a server system 1 and a plurality of client computers 2A and 2B. The server system 1 and a plurality of client computers 2A and 2B are communicably connected via the network 3.

Client computers 2A and 2B are configured in the same way, and are terminal devices used by the member users. The client computer 2A is a terminal device used by a member to be a player, and the client computer 2B is a terminal device used by a member to be a spectator.

The server system 1 is a server device for net games for the member to be a player to manage the baseball game played in a game space using the client computer 2A, and for the member to be a spectator to watch the baseball game using the client computer 2B.

The Internet, for example, is used for the network 3, and various information is transmitted/received between the server system 1 and the client computers 2A and 2B according to TCP/IP (Transmission Control Protocol/Internet Protocol). The network 3 is not limited to the Internet, but another network, such as an intranet, or a network combining various networks including the Internet and an intranet may be used. The server system 1 and client computers 2A and 2B may be inter-connected by a leased line.

When the Internet is used as the network 3, each client computers 2A and 2B is usually connected to a predetermined provider server via a modem, and is connected to the network 3 via this provider server, but to simplify description, the provider server is not illustrated and is not described here.

In the present embodiment, the user who uses the client computers 2A and 2B are members who registered to receive a predetermined service provided by a company who manages the net game, and can play a baseball game as a net game with another member using the server system 1 using the client computer 2A.

Here the net game has a normal game and an encounter league. A normal game is a profile exchange optional game where players can freely exchange profile information, and an encounter league is a game with profile exchange where players always exchange profile information.

Each member to be a player voluntarily accesses the server system 1 using the client computer 2A, and plays a normal game and an encounter league, just like a normal baseball game, in a game space constructed by the server system 1 and the client computer 2. Each member to be a spectator watches the normal game and the encounter league match using the client computer 2B.

Now the server system 1 will be described in detail. The server system 1 comprises a member DB (data base) server 11, mail server 12, lobby server 13, game server 14, WWW (World Wide Web) server 15, and game DB server 16. Each server is connected by such a predetermined network as a LAN (Local Area Network), as illustrated, so that data can be transmitted/received according to the route. The member DB server 11, mail server 12, lobby server 13 and WWW server 15 are connected to the network 3 via a communication unit such as a router (not illustrated), for example.

The member DB server 11 is comprised of a normal data base server device, and executes member registration processing for a user when the user registers for membership to receive a predetermined service provided by a company who manages the net game. The member DB server 11 stores the member ID, password, and accounting information of each member which are decided at membership registration in the data base, and manages the information. The mail server 12 is comprised of a normal mail server device, and manages the electronic mail of each member.

The lobby server 13 is comprised of a normal server device, and executes various lobby processings as a portal site to play net games. For example, the lobby server 13 refers to the member ID and password stored in the member DB server 11 when the member accesses for playing a net game using the client computer 2, and executes authentication processing for the member who accessed.

The lobby server 13 guides the member who was confirmed as an official member by authentication processing to the lobby selected by this member out of a plurality of lobbies, and in the lobby which the member was guided to, the lobby server 13 executes processing for guiding the member to the game area, and the game is played in a game space of the game area where the member was guided to.

The lobby server 13 transmits the game watching information to watch the game which the member to be a player plays using the client computer 2A to the client computers 2B of a plurality of members to be spectators, using the game server 14. At this time, the lobby server 13 receives a message transmitted from the client computer 2B of one of the spectators, and transmits the received message to the client computer 2B of another spectator, so as to enable chat for exchanging messages among spectators in real-time when watching the game.

The lobby server 13 also receives the request to play a game which one spectator sent to another spectator when watching the game, confirms acceptance of the request by the other user, and sets such that the spectators can play a game. The lobby server 13 also gives the player predetermined privileges according to the degree of cheering by the spectators to this player.

The game server 14 is comprised of a normal server device, executes net game progression processing for progressing the net game in a game space where members play a game, and transmits data required for the progression of the net game to the client computer 2A via the lobby server 13.

The game DB server 16 is comprised of a normal data base server device, and stores the various information on the net games, such as the game result, which the client computer 2A sent via the lobby server 13 to the data base, and manages the information.

The WWW server 15 is comprised of a normal WWW server device, creates ranking data from the data on game outcome stored in the game DB server 16, and lists the created ranking data on a predetermined home page so that the ranking data can be read from the client computers 2A and 2B.

Now the client computers 2A and 2B will be described in detail. Each client computer 2A and 2B is comprised of a normal personal computer, which includes a ROM (Read Only Memory) 21, CPU (Central Processing Unit) 22, RAM (Random Access Memory) 23, external storage device 24, input section 25, communication section 26, display section 27, and recording medium driving device 28.

Each block of the client computers 2A and 2B is connected to the internal bus, various data is input/output onboard the client computers 2A and 2B via this bus, and various processings for playing the net game are executed under the control of the CPU 22.

A basic program for operating the client computers 2A and 2B has been stored in the ROM 21. The RAM 23 is used for the work area of the CPU 22. The recording medium 29 is a recording medium which can be read by a computer, such as a CD-ROM. The CD-ROM is provided by a software manufacturer who creates net games, and stores the game progression program at the client side for a member to play a baseball game in the game space.

The recording medium driving device 28 is comprised of a CD-ROM drive, where the game progression program at the client side is read from the recording medium 29 under the control of the CPU 22, and the game progression program at the client side is installed in the external storage device 24.

The recording medium 29 is not limited to the above mentioned example, but if another recording medium driving device, such as a DVD drive or floppy disk drive, is added, the game progression program at the client side may be installed in the external storage device 24 using another recording medium which the computer can read, such as a DVD or floppy disk. If the game progression program at the client side can be downloaded from a home page of a software manufacturer via a network 3, then the game progression program at the client side may be directly downloaded from this home page to the external storage device 24.

The external storage device 24 is comprised of such an external storage device as a hard disk drive. The game progression program at the client side is installed in the external storage device 24, as mentioned above, and various programs, such as a moving picture reproduction program for reproducing 3-dimensional moving pictures according to the game progression program, are preinstalled by a normal method. Here for the moving picture reproduction program, Direct X by Microsoft, for example, can be used.

The CPU 22 reads a basic program from the ROM 21, and reads the game progression program at the client side and the moving picture reproduction program from the external storage device 24, executes net game progression processing to play a normal game and an encounter league, and transmits/receives necessary data to/from the server system 1 via the communication section 26.

The input section 25 is comprised of a keyboard and a mouse, and in the present embodiment, various instructions are input primarily using the mouse according to the operation of the member, and desired messages are input primarily using the keyboard when the spectators exchange messages.

The communication section 26 is comprised of a modem or a router, and controls communication with the server system 1 via the network 3. The display section 27 is comprised of a CRT (Cathode Ray Tube) or liquid crystal display, and displays various screens used for a net game as still pictures or moving pictures under the control of the CPU 22.

Figure 2:
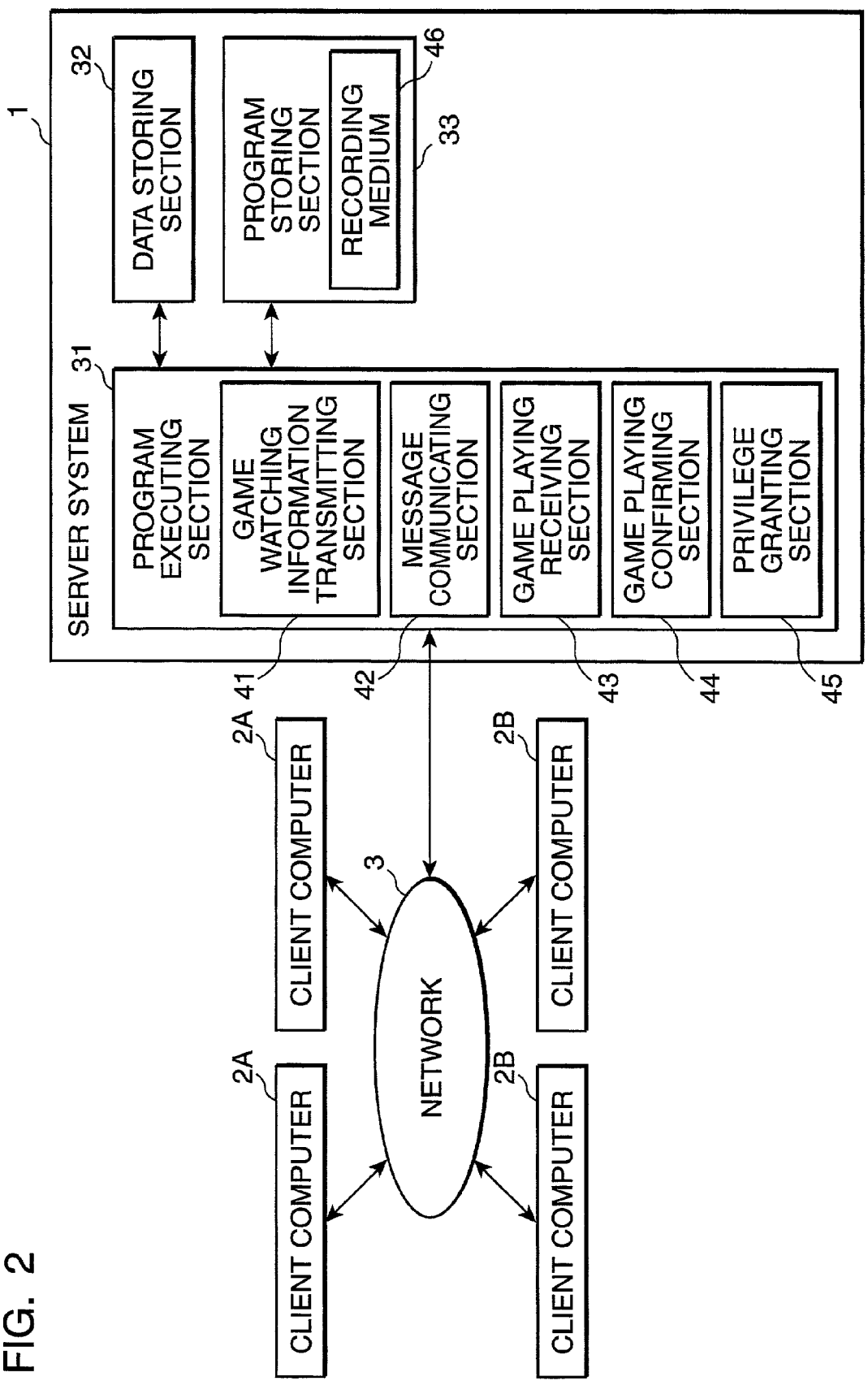
FIG. 2 shows the major functional blocks of the server system shown in FIG. 1.

Now the major functions of the server system 1 configured as above will be described. FIG. 2 shows the major functional blocks of the server system 1 shown in FIG. 1.

As FIG. 2 shows, the server system 1 functionally includes the program executing section 31, data storing section 32, and program storing section 33. The program executing section 31 functionally includes the game watching information transmitting section 41, message communicating section 42, game playing receiving section 43, game playing confirming section 44, and privilege granting section 45. The program storing section 33 includes the recording medium 46 which can be read by a computer.

The program executing section 31 is comprised of the CPUs (not illustrated) of each server 11-16 of the server system 1, and when the CPUs read and execute various programs stored on the recording medium 46, the program executing section 31 thereby functions as the game watching information transmitting section 41, message communicating section 42, game playing receiving section 43, game playing confirming section 44, and privilege granting section 45.

The data storing section 32 is comprised of the RAM (not illustrated) of the lobby server 13, and stores data for the game watching information transmitting section 41, message communicating section 42, game playing receiving section 43, game playing confirming section 44, and privilege granting section 45 to execute the later mentioned processing.

The program storing section 33 is comprised of, for example, the hard disk drives (not illustrated) of each server of the server system 1, and in this case, the recording medium 46 is comprised of a hard disk. The recording medium 46 records the net game management programs, such as the game watching information transmission program, game playing reception program, privilege granting program, and other game progression programs at the server side in a state where the program can be read by a computer.

The recording medium 46 is not limited to the above example, but other recording medium which can be read by a computer, such as a CD-ROM, DVD and floppy disk, may be used if other recording medium driving devices, such as a CD-ROM drive, DVD drive, and floppy disk drive, can be used, and each of the above mentioned programs may be downloaded via the network 3, and may be stored in the hard disk.

The game watching information transmitting section 41 is implemented primarily by the CPU of the lobby server 13, executing the game watching information transmission program. The game watching information transmitting section 41 transmits the game watching information to watch the game played by a member to be a player using the client computer 2A to the client computer 2B of a member to be a spectator.

The message communicating section 42 is implemented primarily by the CPU of the lobby server 13, executing the game watching information transmission program. The message communicating section 42 receives a message transmitted from the client computer 2B of one spectator, and transmits the received message to the client computer 2B of the other spectator. Also the message communicating section 42 sends the received message to the client computer 2A of the player.

The game playing receiving section 43 is implemented primarily by the CPU of the lobby server 13, executing the game playing reception program. The game playing receiving section 43 receives the request to play a game which one spectator sent to the other spectator when watching the game.

The game playing confirming section 44 is implemented primarily by the CPU of the lobby server 13, executing the game playing reception program. The game playing confirming section 44 confirms that the other spectator accepted the request to play a game received by the game playing receiving section 43.

The privilege granting section 45 is implemented primarily by the CPU of the lobby server 13, executing the privilege granting program. The privilege granting section 45 grants a predetermined privilege to the player according to the degree of cheering to this player by the spectators in the present embodiment. In the present embodiment, the lobby server 13 corresponds to the information transmitting means, communicating means, game playing receiving means, game playing confirming means, and privilege granting means.

Now the operation of the net game system configured as mentioned above will be described. In the following description, it is assumed that the users to be players and the spectators have completed the member registration to the member DB server 11, and the member ID and password of the members have been stored in the external storage devices 24 of the client computers 2A and 2B, and have also been stored in and managed by the member DB server 11. It is assumed that playing a net game requires a fee, and the accounting status shows that the members have already paid a predetermined fee, and have the right to play the net game.

When the member starts up the game progression program at the client side using the mouse of the input section 25 of the client computers 2A and 2B, the mode select screen for the member to select a desired mode from a plurality of modes is displayed on the display section 27.

Figure 3:
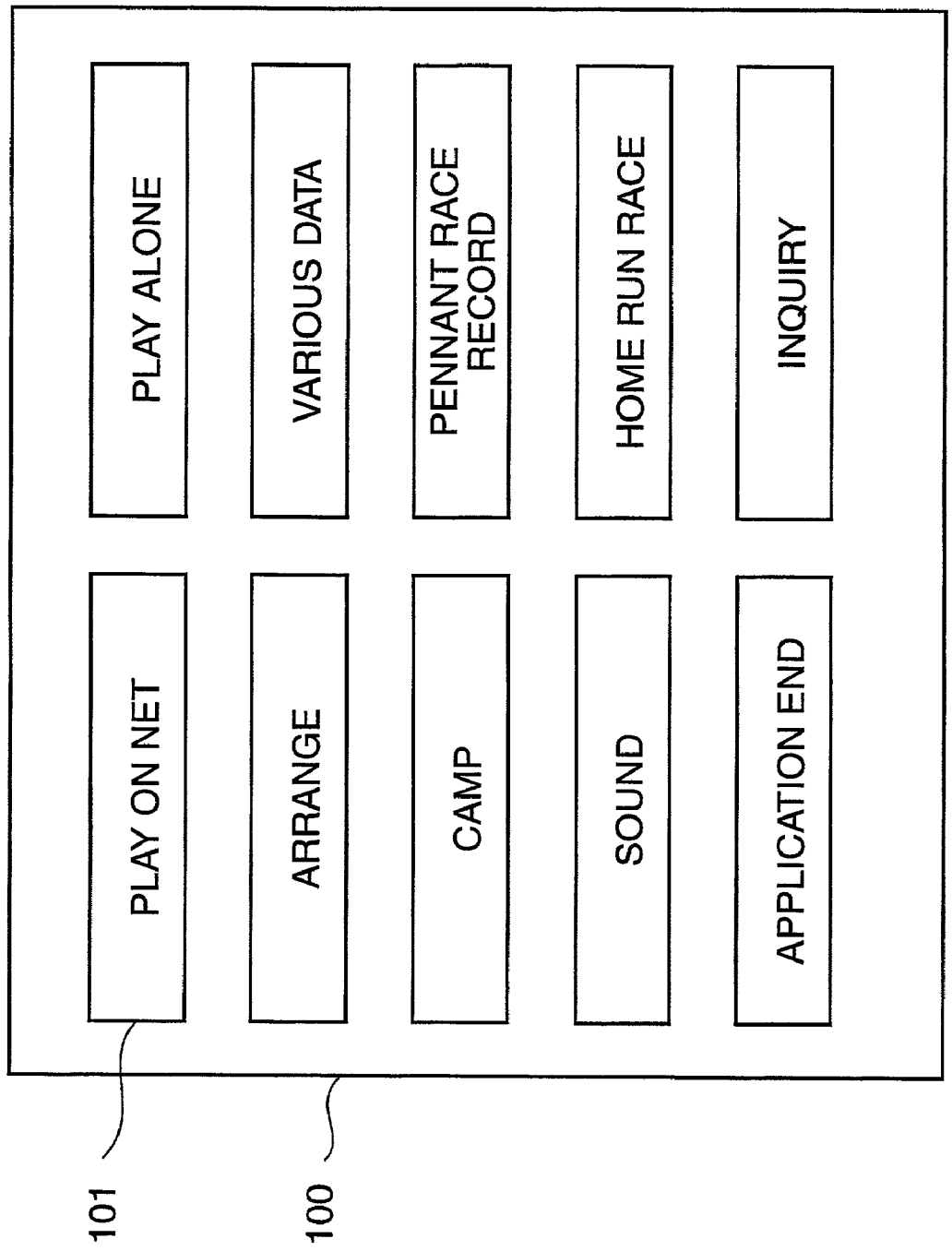
FIG. 3 is a diagram depicting an example of the mode select screen.

FIG. 3 is a diagram depicting an example of the mode select screen. When the mode select screen 100 shown in FIG. 3 is displayed and the member selects the "Play on Net" button 101 using the mouse, the sub-menu screen for the member to select a net game from a plurality of items of the sub-menu is displayed on the display section 27.

Figure 4:
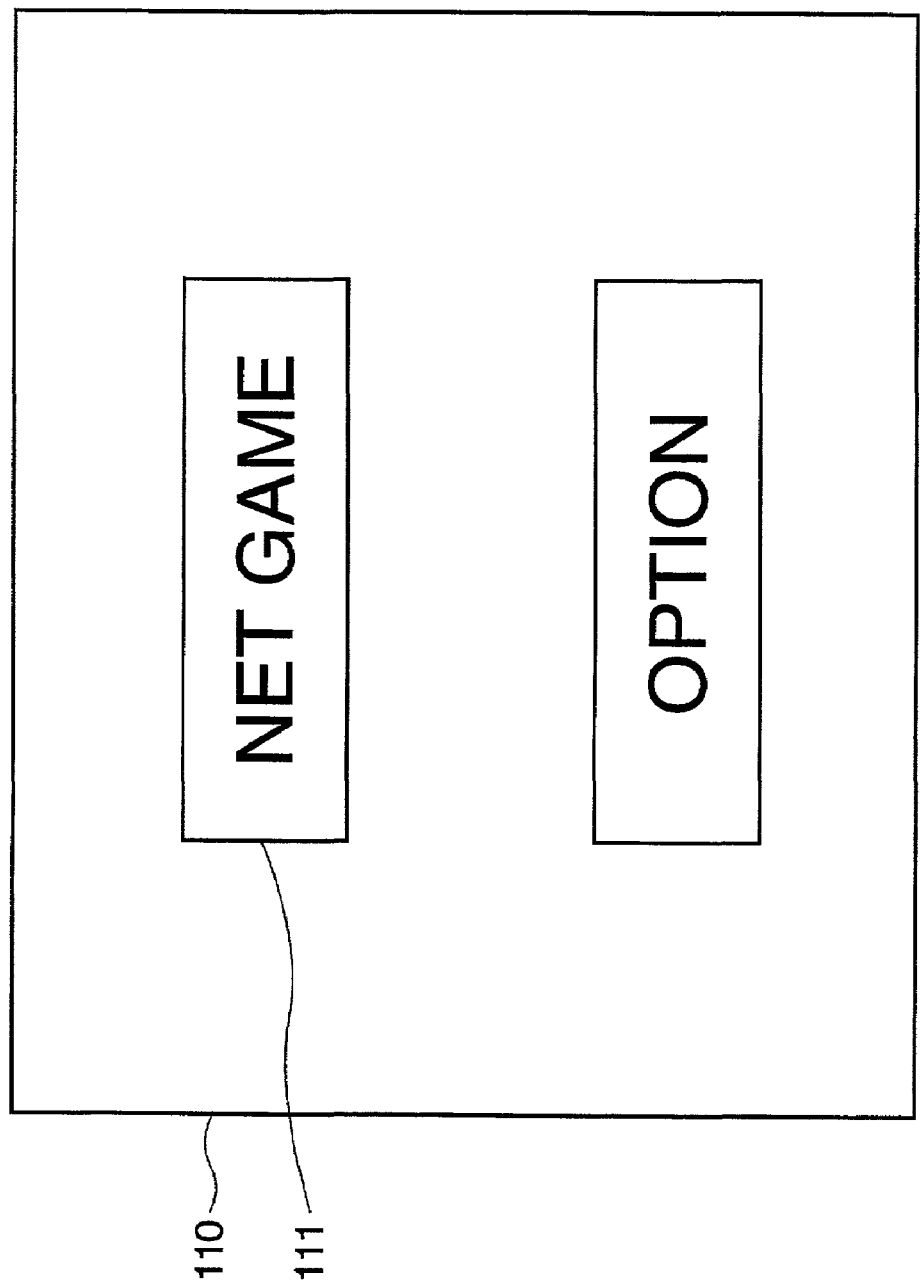
FIG. 4 is a diagram depicting an example of the sub-menu screen.

FIG. 4 is a diagram depicting an example of the sub-menu screen. When the sub-menu screen 110 shown in FIG. 4 is displayed, the member selects the "Net Game" button 111 using the mouse, and the profile information input screen for the member to input the profile information is displayed on the display section 27.

Figure 5:
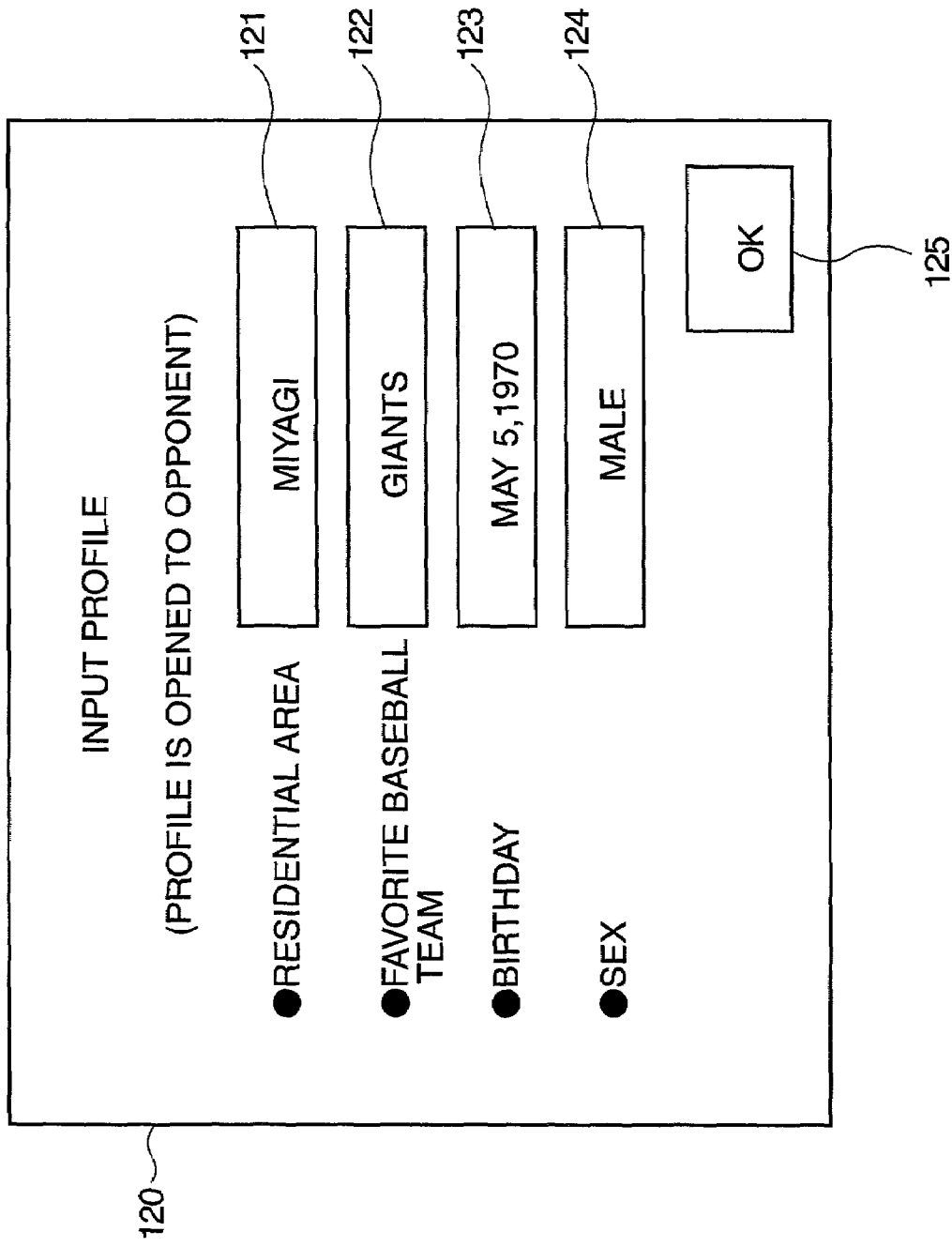
FIG. 5 is a diagram depicting an example of the profile information input screen.

FIG. 5 is a diagram depicting an example of the profile information input screen. When the profile information input screen 120 shown in FIG. 5 is displayed, and the member inputs each information to each input box 121-124 for the residential area, favorite baseball team, birth date and sex, and selects the "OK" button 125, the CPU 22 stores the input information on the residential area, favorite baseball team, birth date and sex in the RAM 21 or the external storage device 24 as profile information.

After the profile information is input as above, the team select screen, which the member will use for the net game, is displayed on the display section 27, and the CPU 22 stores the team name selected by the member in the RAM 21 or the external storage device 24.

Then the confirmation screen for rule setting and game setting to be used for the net game is displayed on the display section 27, where the member confirms the rule setting, etc. Here the rule setting is, for example, the number of innings in a game, whether extra innings are played in a game, whether a game can be called, and whether the DH system is used, and the game setting is, for example, the wind status, weather status, game time zone, error occurrence status, player condition status, and player injuries.

After the above mentioned rule setting and other processing ends, the client computers 2A and 2B access the lobby server 13 via the network 3, and the CPU 22 transmits the member ID and password stored in the external storage device 24 to the lobby server 13 using the communication section 26, and transmits the information, such as profile information and team name, stored in the RAM 21 or external storage device 24, to the lobby server 13.

Here the lobby server 13 receives the transmitted member ID and password, and inquires the member DB server 11 whether the member to which the received member ID and password are granted has the right to play a game. The member DB server 11 checks the accounting status of the member specified by the member ID and password, and notifies the result on whether the member has the right to play a game to the lobby server 13.

In this case, the member has the right to play a game, so the member DB server 11 notifies the lobby server 13 that this member has the right to play a game, and the lobby server 13 stores the received profile information in the RAM for each member, and stores such information as the profile information and team name in the game DB server 16 for each member.

In this way, according to the present embodiment, various information, such as the profile information and team name, are collectively sent to the server system 1 after all the setup processing ends, so the connection time between the server system 1 can client computers 2A and 2B can be decreased, and unnecessary accounting fees are not charged.

Then the lobby server 13 sends the data for displaying the game lobby select screen to select a desired game lobby to the client computers 2A and 2B.

Figure 6:
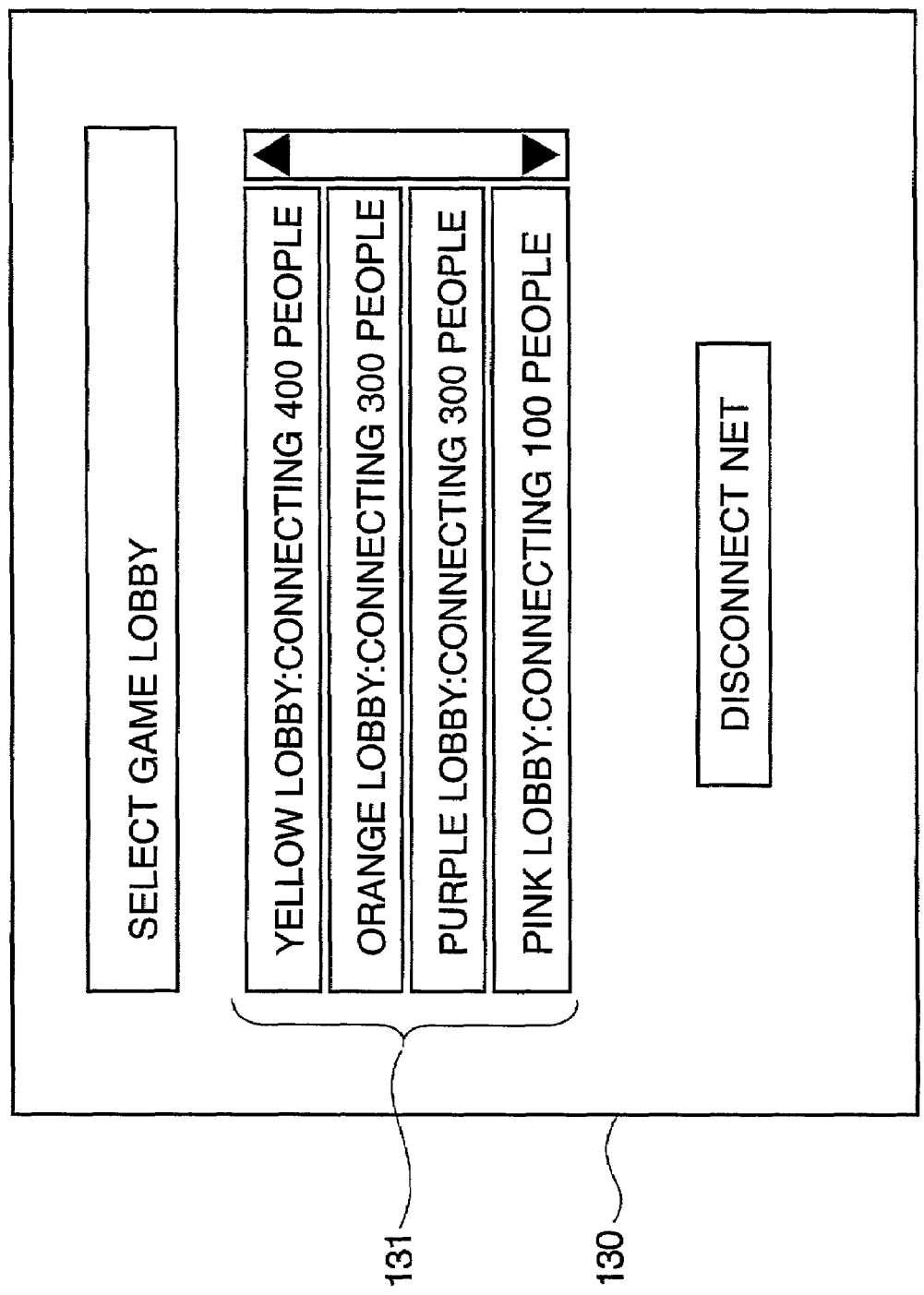
FIG. 6 is a diagram depicting an example of the game lobby select screen.

FIG. 6 is a diagram depicting an example of the game lobby select screen. The client computers 2A and 2B display the game lobby select screen 130 shown in FIG. 6 on the display section 27, for example, using the received data, where a plurality of game lobby select buttons 131 are displayed.

The name of each game lobby is displayed and the number of members in each game lobby is displayed on the select buttons 131 of each game lobby. If the member selects a desired game lobby select button from the plurality of game lobby select buttons 131 using the mouse at this time, the lobby server 13 sends data, for displaying the game area select screen to select a desired game area out of a plurality of game areas, to the client computers 2A and 2B.

Figure 7:
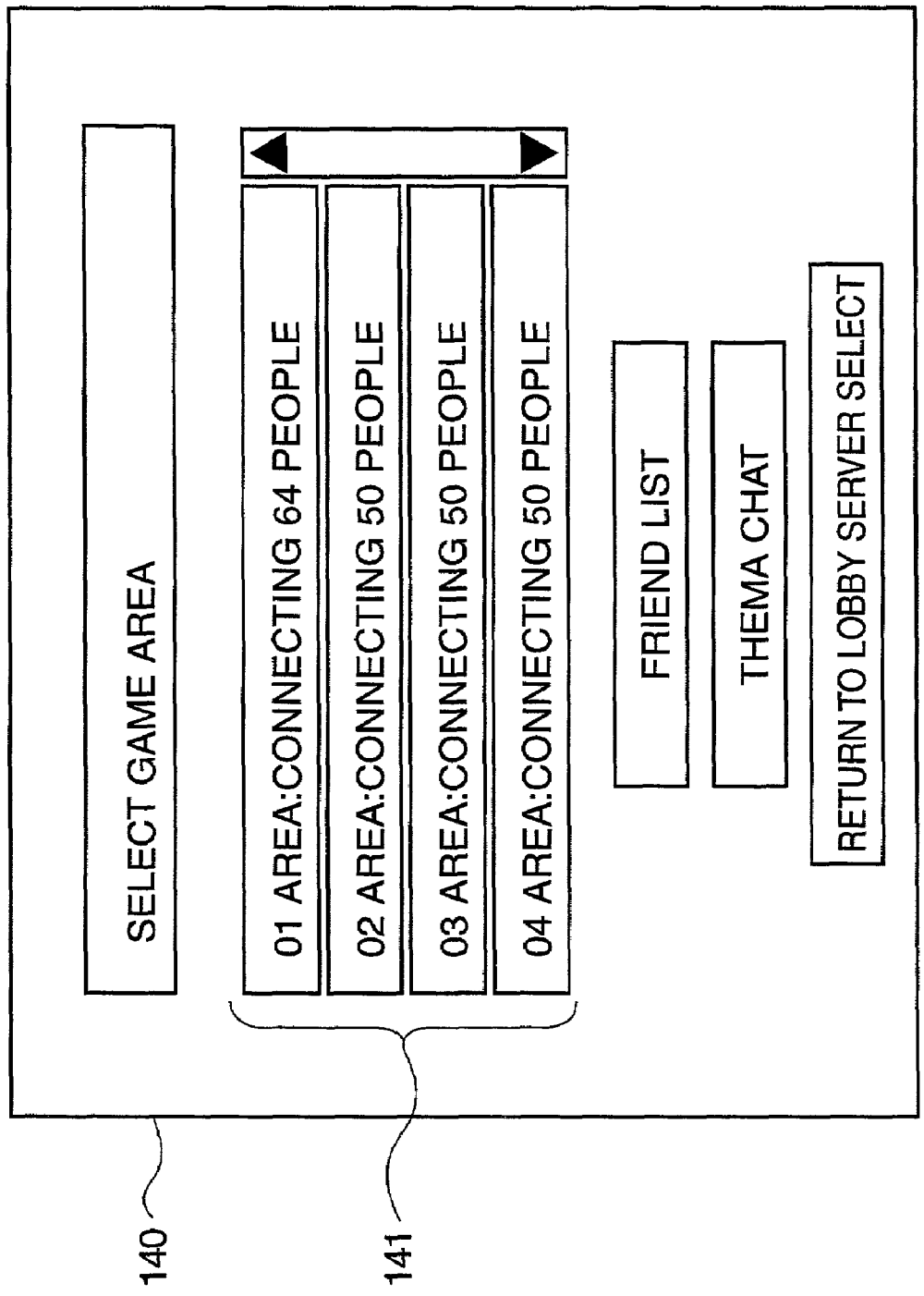
FIG. 7 is a diagram depicting an example of the game area select screen.

FIG. 7 is a diagram depicting an example of the game area select screen. The client computers 2A and 2B display the game area select screen 140 shown in FIG. 7 on the display section 27 using the received data, where a plurality of game area select buttons 141 are displayed.

The name of each game area is displayed and the number of members in each game area is displayed on each game area select button 141. When the member selects the desired game area select button from the plurality of game area select buttons 141 using the mouse, the CPUs 22 of the client computers 2A and 2B display the game mode select screen on the display section 27 to select the game mode.

Figure 8:
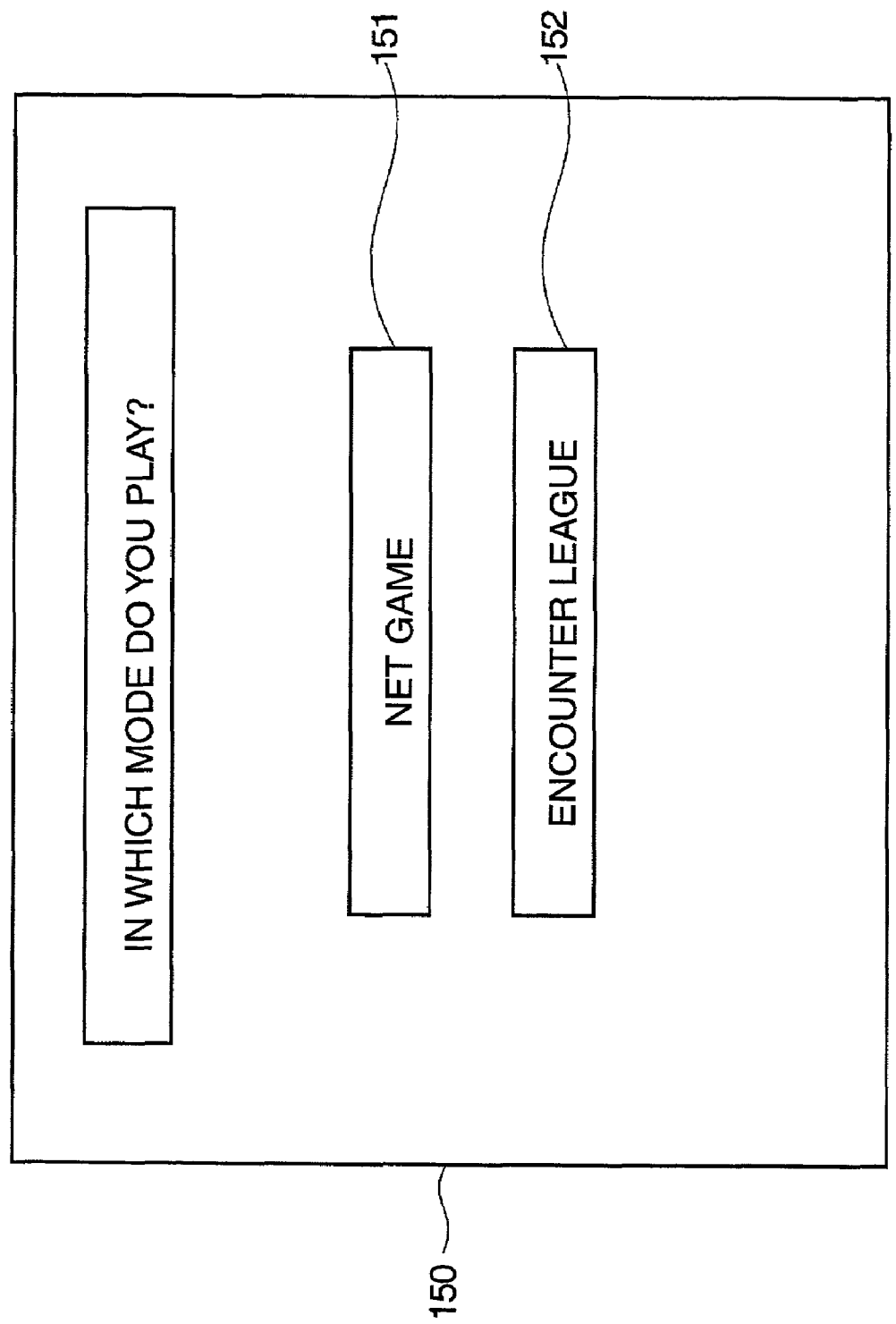
FIG. 8 is a diagram depicting an example of the game mode select screen.

FIG. 8 is a diagram depicting an example of the game mode select screen. When the game mode select screen 150 shown in FIG. 8 is displayed and a member selects the "Net Game" button 151 using a mouse, for example, the lobby server 13 transmits data for displaying the net game lobby top screen to the client computers 2A and 2B.

Figure 9:
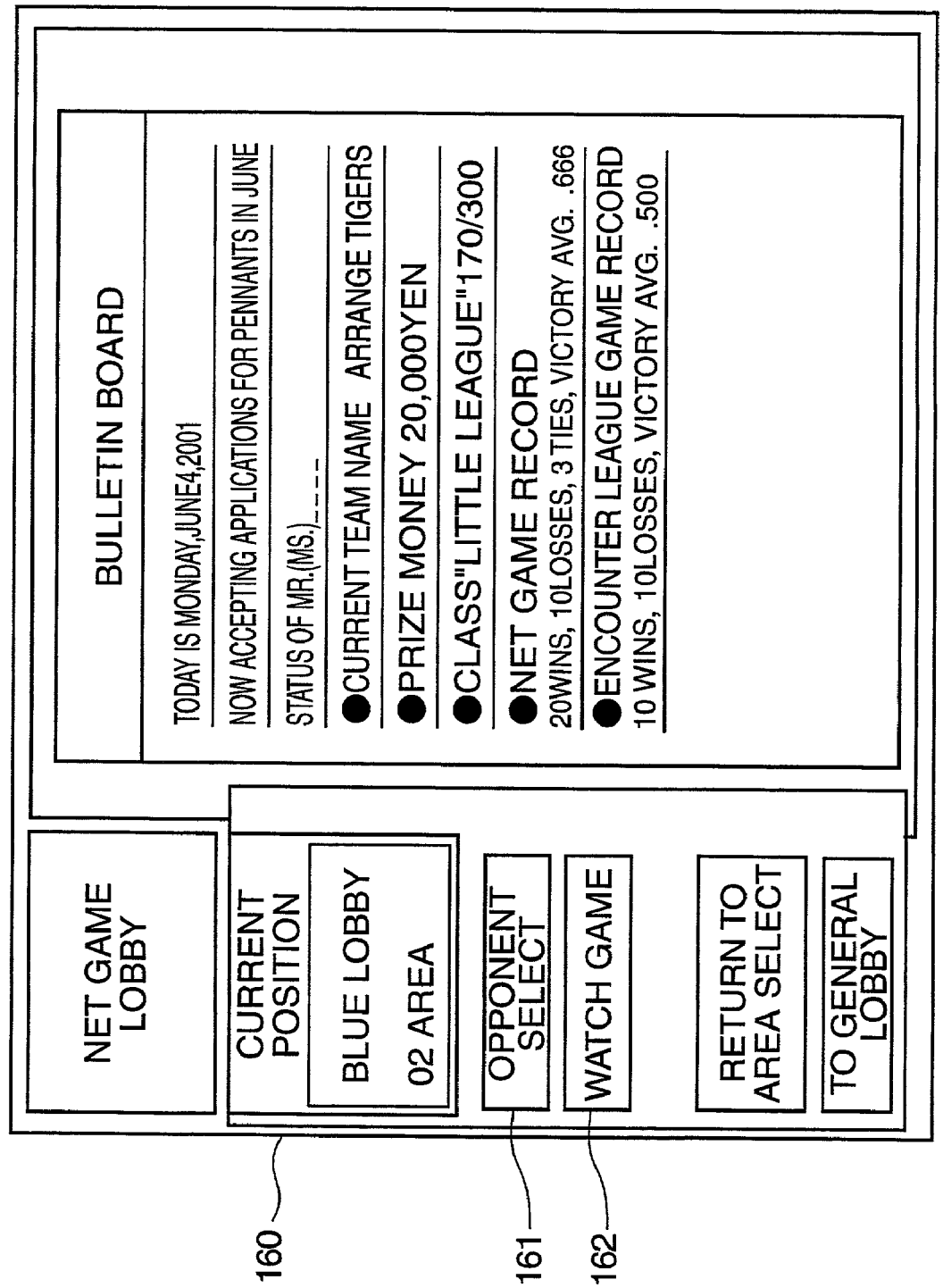
FIG. 9 is an example depicting the net game lobby top screen.

FIG. 9 is a diagram depicting an example of the net game lobby top screen. The client computers 2A and 2B display the net game lobby top screen 160 shown in FIG. 9, for example, on the display section 27 using the received data. When a member to be a player selects the "Opponent Select" button 161 using the mouse of the input section 25 of the client computer 2A, an opponent is determined by a predetermined processing, and the baseball game as a net game starts.

When a member to be a player selects the "Encounter League" button 152 shown in FIG. 8 using the mouse as well, an opponent is determined by a predetermined processing, and the baseball game as encounter league starts.

Whereas when a member to be a spectator selects the "Watch Game" button 162 shown in FIG. 9 using the mouse of the input section 25 of the client computer 2B, the later mentioned game watching information transmission processing starts.

Figure 10:
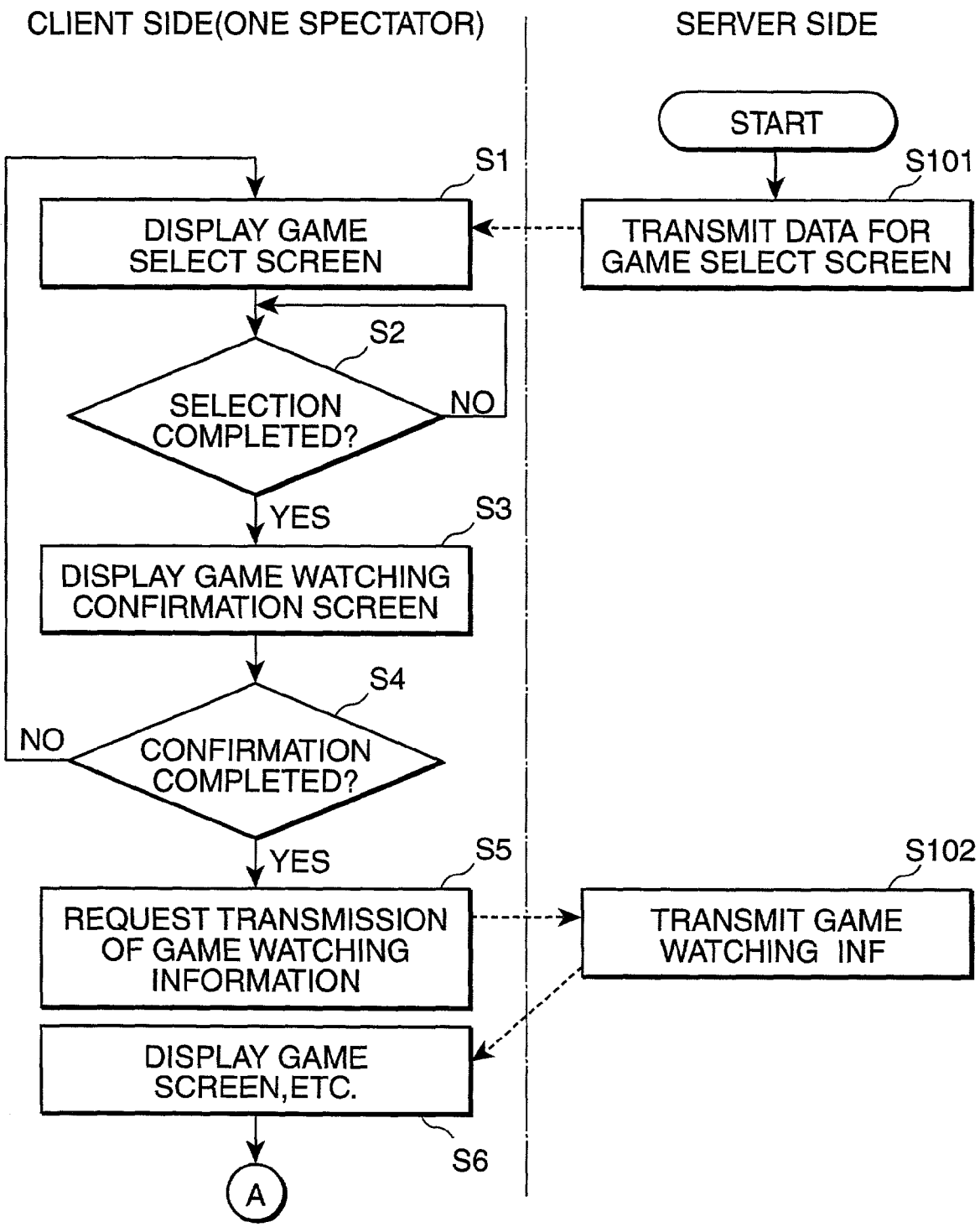
FIG. 10 is a first flow chart depicting an example of game watching information transmission processing by the server system and client computer shown in FIG. 1.
Figure 11:
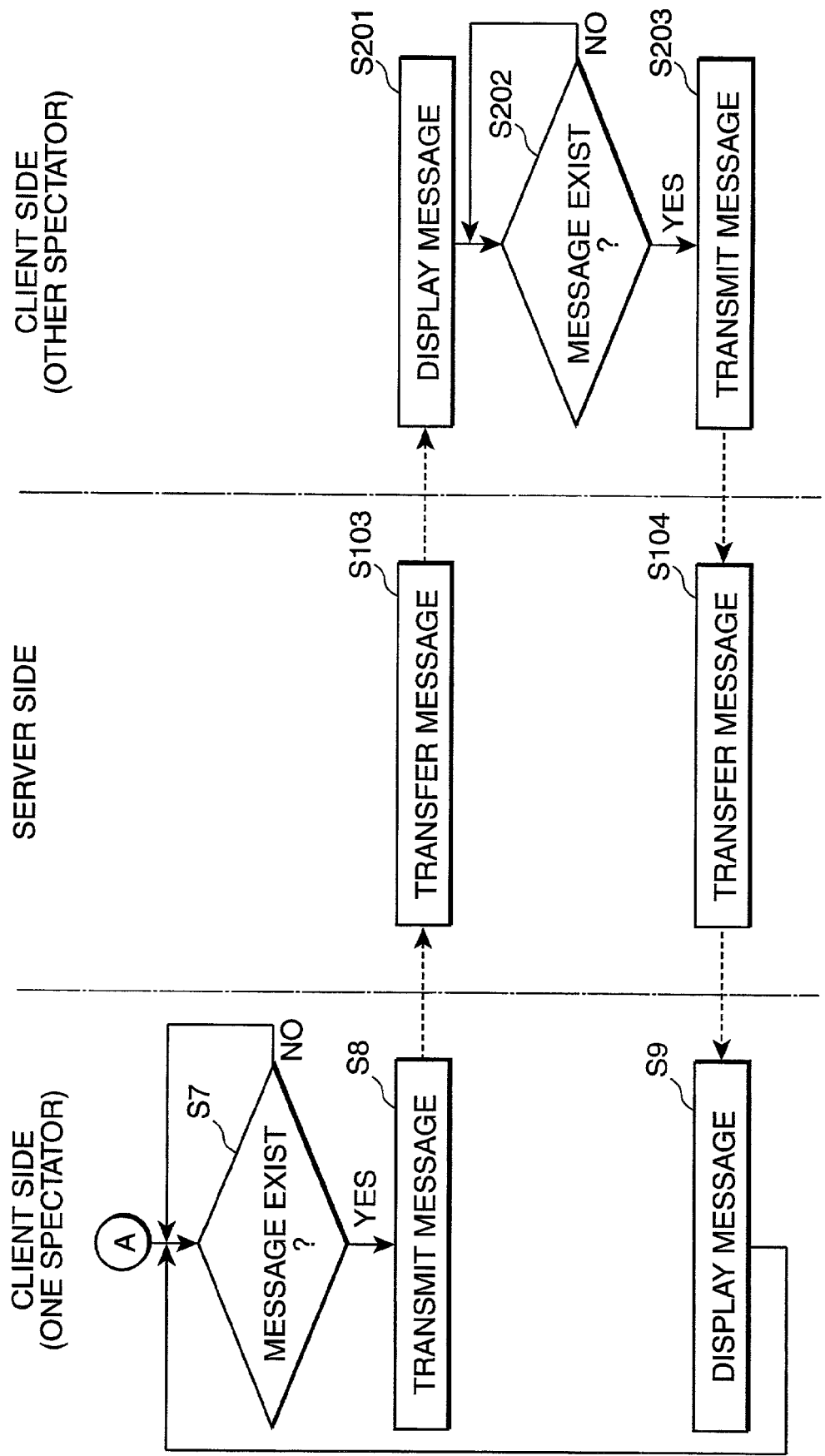
FIG. 11 is a second flow chart depicting an example of game watching information transmission processing by the server system and client computer shown in FIG. 1.

FIG. 10 and FIG. 11 are the first and second flow charts depicting an example of game watching information transmission processing by the server system 1 and client computers 2A and 2B shown in FIG. 1. The game watching information transmission processing at the client computer 2 side shown in FIG. 10 and FIG. 11 is implemented by the CPUs 22 of the client computers 2A and 2B, executing the game progression program, and the game watching information transmission processing at the server side 1 side is implemented by the lobby server 13, executing the game watching information transmission program.

As FIG. 10 shows, in Step S101, the lobby server 13 transmits data for displaying the game watching select screen to the client computer 2B of one spectator.

Figure 12:
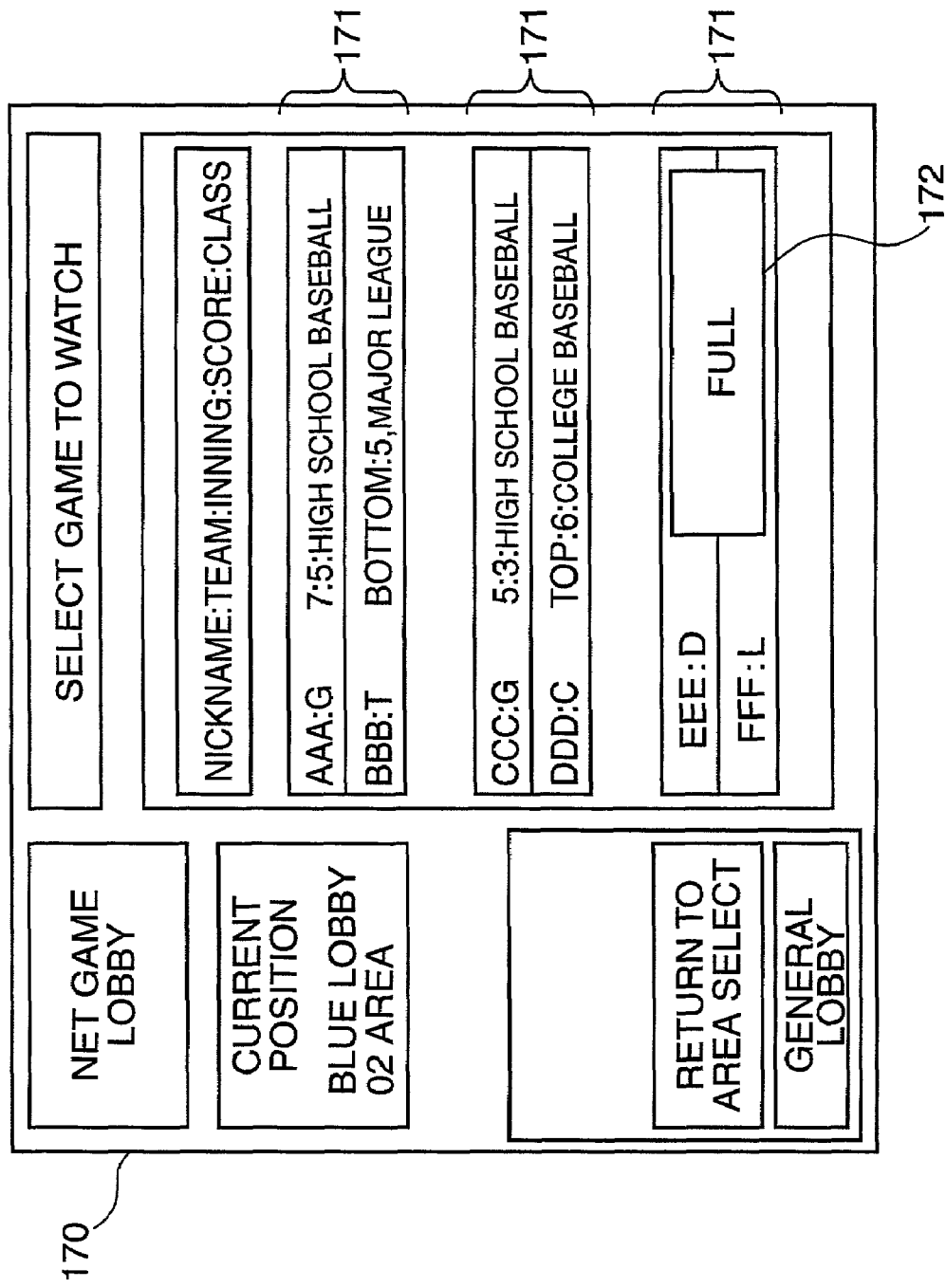
FIG. 12 is a diagram depicting an example of the game watching select screen.

Then in Step S1, the CPU 22 of the client computer 2B of one spectator displays the game watching select screen for selecting a game for this spectator to watch on the display section 27 using the received data. FIG. 12 is a diagram depicting an example of the game watching select screen. For example, the game watching select screen 170 shown in FIG. 12 is displayed, and a plurality of selectable games are displayed on the game select buttons 171.

On the game select buttons 171, a nickname of the opponent (e.g. "AAA" in FIG. 12), team name (e.g. "G" in FIG. 12), the current number of innings, score status and class to indicate the level of the opponent, are displayed. By referring to such information, the spectator can select a desired game to play.

When the spectator cannot watch the game because the field is full, full indication 172 to show that the field is full is displayed, so that games which can be watched can be known at first sight. To simplify description, the number of spectators is limited to two, and full indication 172 is displayed when the number of spectators becomes two in the following description, but the number of spectators is not limited by this example, and it may be designed such that three or more spectators may watch a game.

Then in Step S2, the CPU 22 judges whether this spectator selected a game select button 171 using the mouse or the like of the input section 25, and selected a game to watch, but if a game is not selected, the CPU 22 repeats Step S2, and if a game is selected, processing moves to Step S3.

Figure 13:
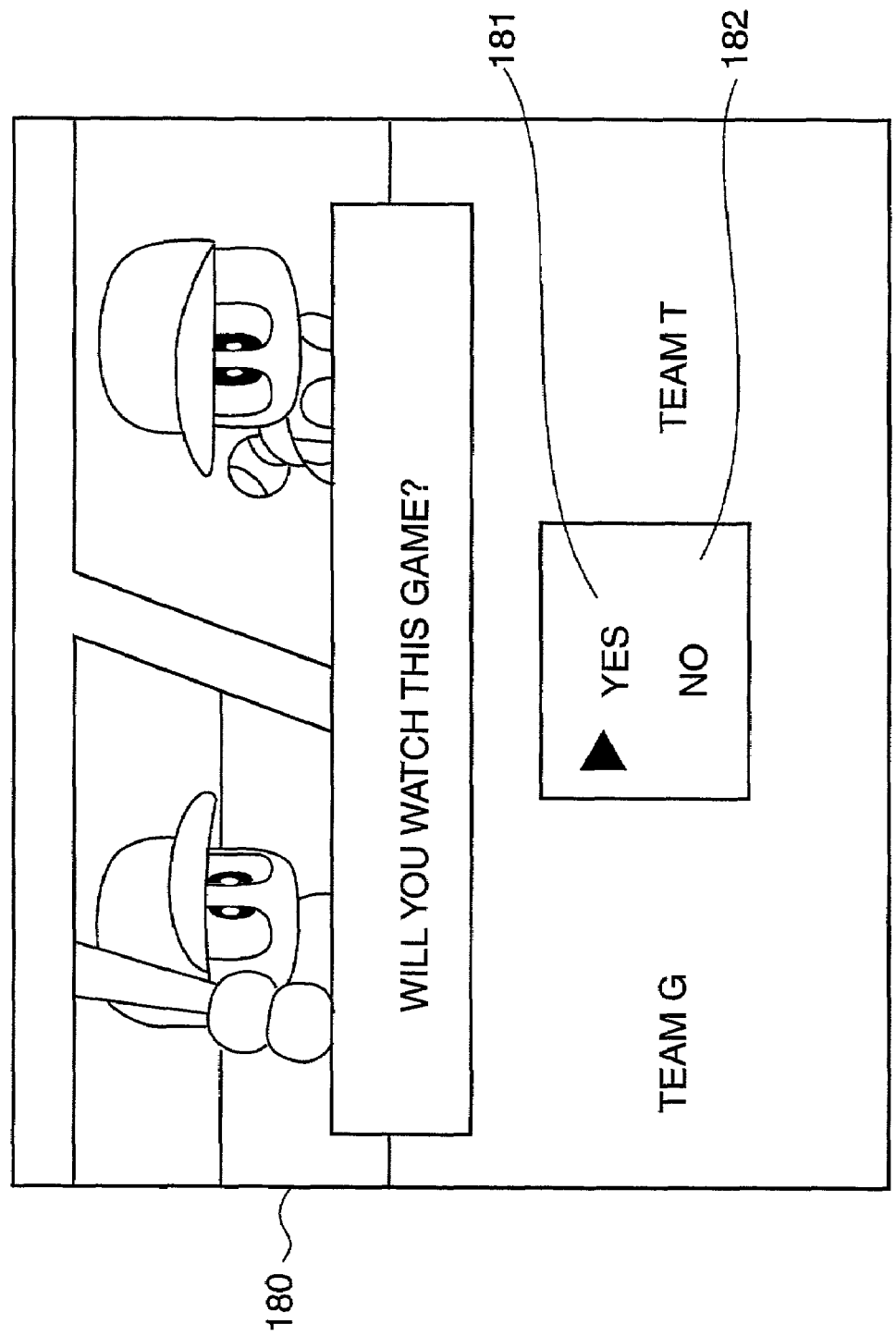
FIG. 13 is a diagram depicting an example of the game watching confirmation screen.

When a game is selected, in Step S3, the CPU 22 displays a game watching confirmation screen for confirming that this spectator will watch the selected game on the display section 27. FIG. 13 is a diagram for depicting an example of the game watching confirmation screen. For example, the game watching confirmation screen 180 shown in FIG. 13 is displayed.

Then in Step S4, the CPU 22 judges whether this spectator selected the "YES" button 181 in FIG. 13 using the mouse of the input section 25, and confirmation on the game to watch has completed, and if the spectator selected the "NO" button 182 in FIG. 13, and confirmation on the game to watch has not completed, processing returns to Step S1 to continue subsequent processing, and when confirmation of the game to watch has completed, processing moves to Step S5.

When the confirmation of the game to watch has completed, the CPU 22 requests the lobby server 13 to transmit the game watching information to watch the confirmed game using the communication section 26 in Step S5.

Then in Step S102, the lobby server 13 reads the game watching information to watch the requested game from the game server 14, which is executing the progression processing of the game, and transmits the read game watching information to the client computer 2B.

Then in Step S6, the CPU 22 displays the baseball game which the member to be a player is playing in the game space using the received game watching information on a predetermined window on the display screen of the display section 27. Therefore the game screen, the same as the game screen of the baseball game which the player is playing, is displayed on the display section 27, and one spectator can watch the baseball game that the player is playing.

Figure 14:
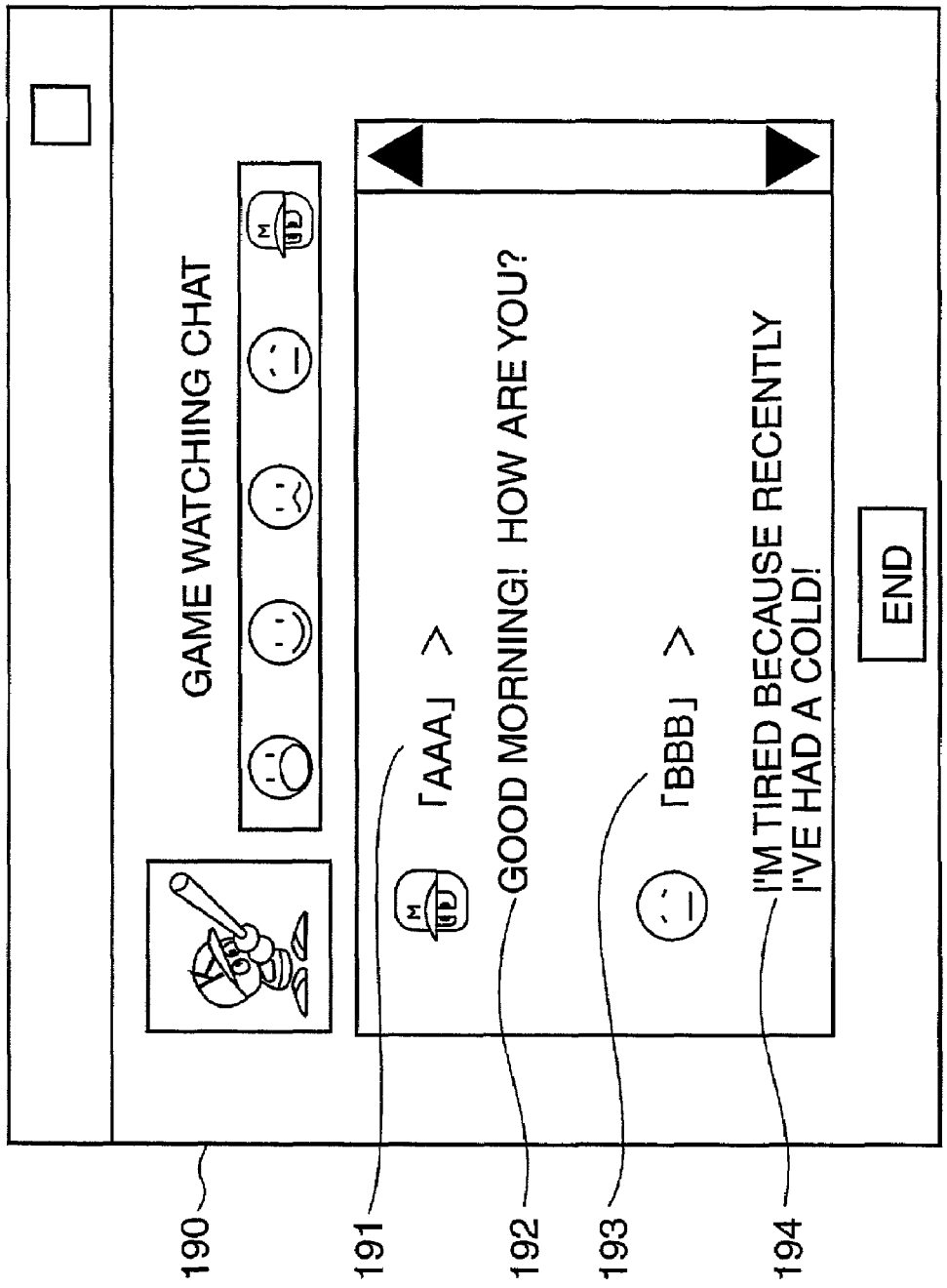
FIG. 14 is a diagram depicting an example of the chat window screen.

As soon as watching the game starts, the CPU 22 displays the chat window screen for the spectator to chat on another window. FIG. 14 is a diagram depicting an example of the chat window screen. For example, the chat window screen 190 shown in FIG. 14 is displayed on the display section 27.

Then in Step S7 shown in FIG. 11, the CPU 22 judges whether the spectator has input a message using the keyboard of the input section 25, and if a message is not input, Step S7 is repeated, and if a message is input, processing moves to Step S8.

When a message is input, the CPU 22 displays the message which was input on the chat window screen 190, and transmits this message to the lobby server 13 in Step S8.

Then in Step S103, the lobby server 13 transmits the received message to the client computer 2B of the other spectator. At this time, it is assumed that the processing in the above mentioned Steps S1-S6 is also being executed in the client computer 2B of the other spectator in the same way where the chat window screen is displayed.

Then in Step S201, the CPU 22 of the client computer 2B of the other spectator receives the message using the communication section 26, and displays the message which the former spectator has input on the chat window screen.

Then in Step S202, the CPU 22 judges whether the other spectator has input a message using the keyboard of the input section 25, and if a message is not input, the Step S202 is repeated, and if the message is input, processing moves to Step S203.

When a message is input, in Step 203, the CPU 22 displays the message which was input on the chat window screen, and transmits this message to the lobby server 13.

Then in Step S104, the lobby server 13 transmits the received message to the client computer 2B of the former spectator.

Then in Step S9, the CPU 22 of the client computer 2B of the former spectator receives the message using the communication section 26, and displays the message which the other spectator input on the chat window screen 190. In this way, as FIG. 13 shows, for example, the messages 192 and 194 input by each spectator are displayed after the nicknames 191 and 192 of each spectator. Then processing returns to Step S7 to continue subsequent processing, so that the spectators can sequentially exchange messages and can chat with each other. If there are three or more spectators, the message of one spectator is transmitted to all the other spectators, and messages are exchanged among all the spectators.

In this way, according to the present embodiment, the game watching information for watching the game which members to be players are playing in the baseball game as a net game is transmitted to the client computers 2B of the two members to be spectators of this game, so the spectators can watch the baseball game which the members to be players are playing by receiving the transmitted game watching information using the client computer 2B. Also a message which is transmitted from the client computer 2B of former spectator is received, and the received message is transmitted to the client computer 2B of the other spectator, so messages can be exchanged between spectators while watching the baseball game.

Since the spectators can exchange opinions and criticisms on the baseball game as messages while watching the baseball game, the excitement of watching games by the interchange of spectators can be given to the spectators, and the excitement of watching a baseball game as a net game can be improved.

In the above description, the lobby server 13 transmits the message of one spectator to the other spectator in Step S103, and transmits the message of the other spectator to the former spectator in Step S104, but each message may be transmitted to the client computer 2A of each player. In this case, the CPU 22 of the client computer 2A of each player displays the chat window screen shown in FIG. 14 on the display section 27.

In this case, the player can also see the messages exchanged between spectators, so the enthusiasm of the players to the game can be heightened by the messages of cheering by the spectators. As a result, the players can play a heated game, the spectators can watch the heated game, and the excitement of the baseball game as a net game can be further improved for the players and spectators.

If one spectator clicks on the nickname 193 of the other spectator displayed on the chat window screen 190 shown in FIG. 14, for example, using the mouse of the input section 25 when the game is being watched as described above, the later mentioned game playing receiving processing starts.

Figure 15:
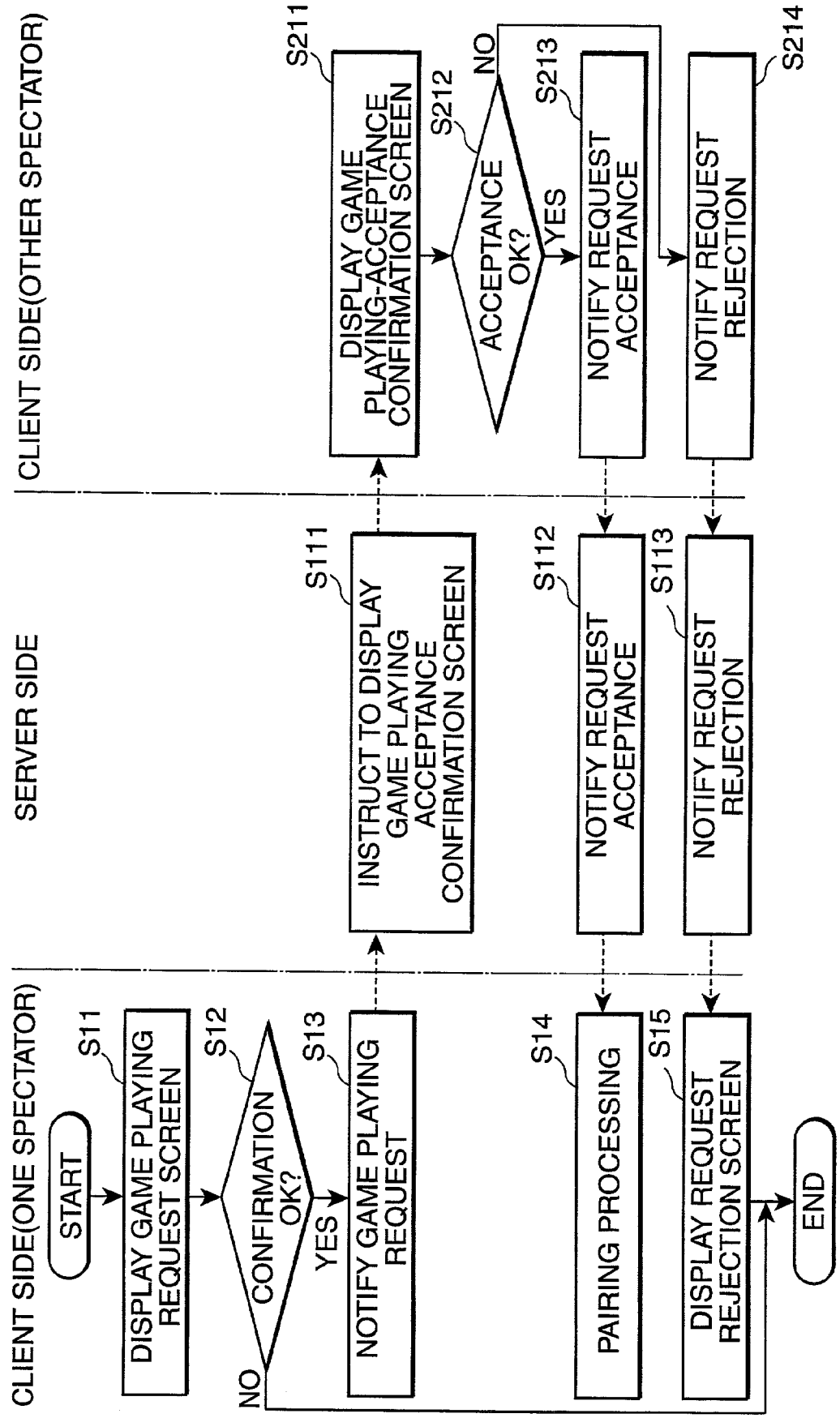
FIG. 15 is a flow chart depicting an example of game playing acceptance processing by the server system and client computer shown in FIG. 1.

FIG. 15 is a flow chart depicting an example of the game playing receiving processing by the server system 1 and client computers 2A and 2B shown in FIG. 1. The game playing receiving processing at the client computer 2 side shown in FIG. 15 is implemented by the CPU 22 of the client computers 2A and 2B, executing the game progression program, and the game playing receiving processing at the server system 1 side is implemented by the lobby server 13 or the like, executing the game playing receiving program.

Figure 16:
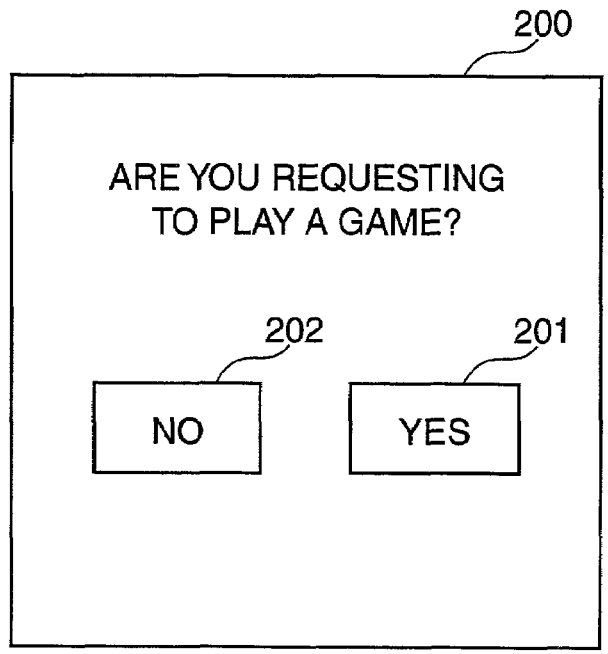
FIG. 16 is a diagram depicting an example of the game request screen.

As FIG. 15 shows, in Step S11, the CPU 22 of the client computer 2B of one spectator displays the game playing request screen for requesting to play a game together on the display section 27. FIG. 16 is a diagram depicting an example of the game playing request screen. For example, the game playing request screen 200 shown in FIG. 16 is displayed.

Then in Step S12, the CPU 22 judges whether this spectator confirmed the request to play a game by selecting the "YES" button 201 shown in FIG. 16 using the mouse of the input section 25, and if the request to play a game is not confirmed by selecting the "NO" button 202 shown in FIG. 16, the CPU 22 closes the game playing request screen 200 to end processing, and if the request to play a game is confirmed, processing moves to Step S13.

When the request to play a game is confirmed, the CPU 22 requests the lobby server 13 to request to play a game using the communication section 26 in Step S13.

Then in Step S112, the lobby server 13 instructs the client computer 2B of the other spectator to display the game playing acceptance confirmation screen for confirming the acceptance of the request to play a game.

Figure 17:
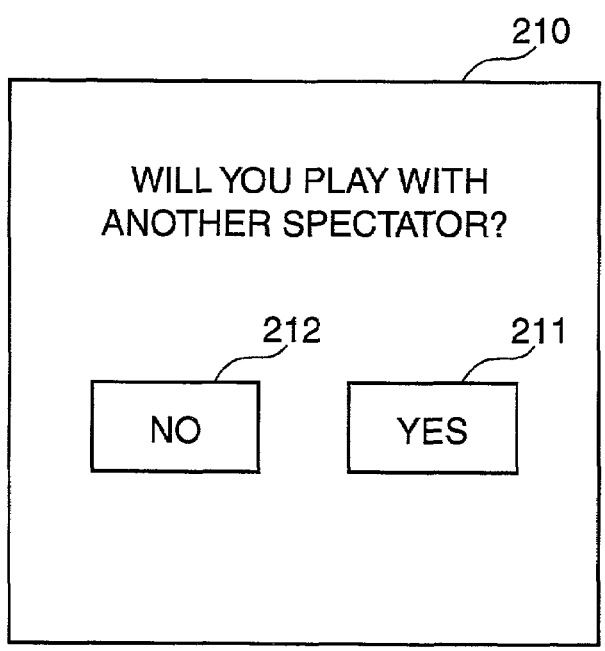
FIG. 17 is a diagram depicting the game play acceptance confirmation screen.

Then in Step S211, the CPU 22 of the client computer 2B of the other spectator displays the game playing acceptance confirmation screen instructed by the lobby server 13 on the display section 27. FIG. 17 is a diagram depicting an example of the game playing acceptance confirmation screen. For example, the game playing acceptance confirmation screen 210 shown in FIG. 17 is displayed.

Then in Step S212, the CPU 22 judges whether the other spectator accepted the request to play a game by selecting the "YES" button 211 shown in FIG. 17 using the mouse of the input section 25, and if the request to play a game is rejected by selecting the "NO" button 212 shown in FIG. 17, processing moves to Step S214, and if the request to play a game is accepted, processing moves to Step S213.

When the request to play a game is accepted, the CPU 22 notifies the lobby server 13 using the communication section 26 that the request to play a game was accepted in Step S213, and starts the pairing processing, just like the above mentioned normal game.

Then in Step S112, the lobby server 13 notifies the client computer 2B of the former spectator that the request to play a game is accepted.

Then in Step S14, the CPU 22 of the client computer 2B of the former spectator starts the pairing processing, just like the above mentioned normal game, and the game between spectators starts.

When the request to play a game is rejected (NO in Step S212), in Step 214, the CPU 22 notifies the lobby server 13 using the communication section 26 that the request to play a game is rejected.

Then in Step S113, the lobby server 13 notifies the client computer 2B of the former spectator that the request to play a game is rejected.

Figure 18:
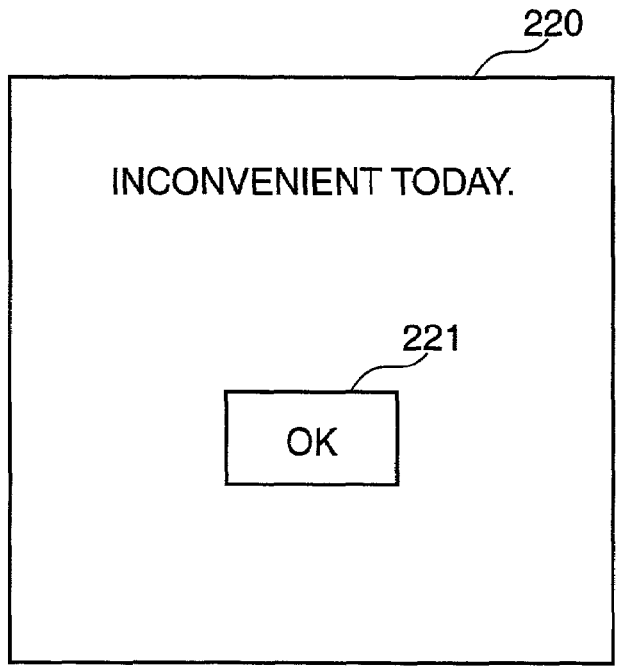
FIG. 18 is a diagram depicting an example of the request rejection notification screen.

Then in Step S15, the CPU 22 of the client computer 2B of the former spectator displays the request rejection notification screen on the display section 27, so as to notify that the request to play a game is rejected. FIG. 18 is a diagram depicting an example of the request rejection notification screen. For example, when the request rejection notification screen 220 shown in FIG. 18 is displayed, and the former spectator selects the "OK" button 221 shown in FIG. 18 using the mouse of the input section 25 to confirm that the request to play a game is rejected, processing ends.

In this way, according to the present embodiment, the request to play a game from one spectator sent to the other spectator when watching the game is received, acceptance of the other spectator to the received request to play a game is confirmed, and the game between the spectators is started when the other spectator accepts. Since a spectator can request to play a game to another spectator whom the former spectator became interested in through the above mentioned chat, the spectator can not only watch a game but can play a game with another spectator whom the former spectator became interested in, therefore the choice of the spectator on how to enjoy the baseball game as a net game can be expanded, and the excitement of a baseball game as a net game can be further improved.

Now privilege granting processing for granting a predetermined privilege to a player according to the degree of cheering by the spectator to this player will be described. In the above description, the number of spectators was limited to two, but in the following description, the number of spectators is not limited, and it is assumed that the number of spectators watching the game played by the player is used as the degree of cheering of the spectators, and the right to play a net game (fee to play a net game) is used as a predetermined privilege. The degree of cheering of the spectators is not limited to this example, but the number of cheering messages by the spectators may be used, and a predetermined privilege is not limited to this example either, but the ability parameter of the character (baseball player) which the player uses for the net game may be improved.

Figure 19:
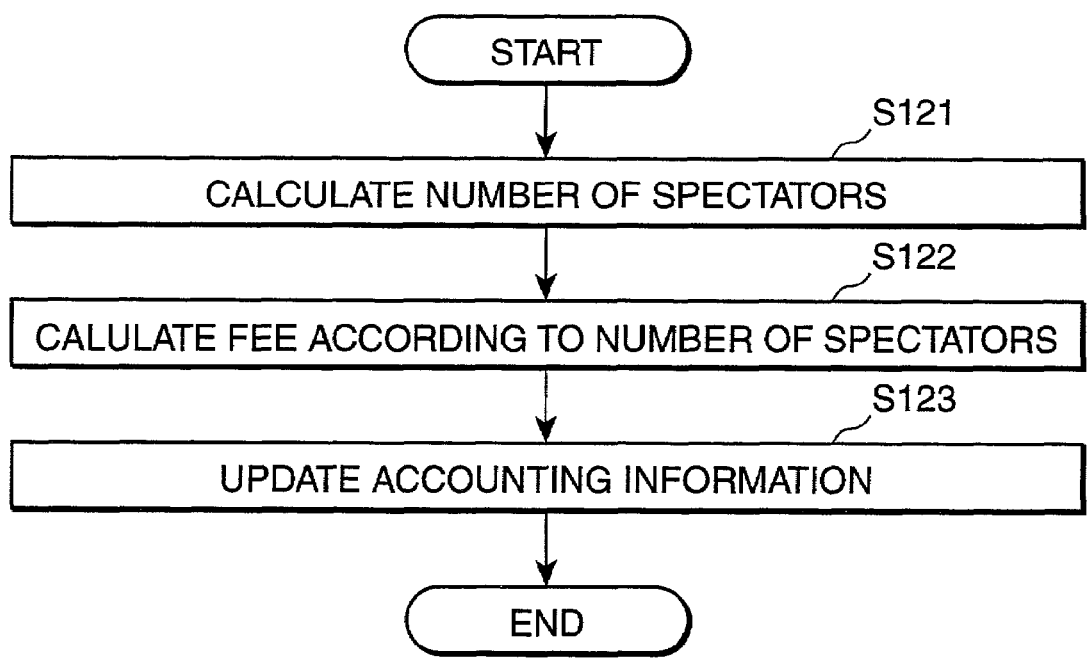
FIG. 19 is a flow chart depicting an example of privilege granting processing by the server system shown in FIG. 1.

FIG. 19 is a flow chart depicting an example of the privilege granting processing by the server system 1 shown in FIG. 1. The privilege granting processing in FIG. 19 is implemented by the lobby server 13, executing the privilege granting program.

When a member to be a player is playing a game, the lobby server 13 detects the number of spectators watching the game, that is, the number of client computers 2B which are accessing to watch the game in Step S121, as shown in FIG. 19.

Then in Step S122, the lobby server 13 calculates a fee for the detected number of spectators. For example, if a fee to play a baseball game for 10 minutes is given to each player for each spectator, the lobby server 13 calculates the case of two spectators into a fee to play the baseball game for 20 minutes.

Then in Step S123, the lobby server 13 adds the calculated fee to the fee which each player has already paid, updates the accounting status of each player stored in the member DB server 11, and ends processing.

In this way, according to the present embodiment, the right to play the net game is given to the player according to the number of spectators, so the enthusiasm of the player to the game can be heightened. As a result, the players can play a heated game, the spectators can watch the heated game, and the excitement of the baseball game as a net game can be further improved for the players and spectators.

In the present embodiment, messages by chat are displayed on the chat window screen, but if the client computers 2A and 2B have such a voice output section as a speaker, the messages may be presented to the spectators and players by voice.

Also according to the present invention, a personal computer is used as the terminal device, but other terminal devices, such as a portable telephone and a portable information terminal, may be used only if the net game can be played on such a device.

Information to be transmitted/received between the server system 1 and client computer 2 may be encrypted using known encryption technology. In this case, the security of each information to be transmitted can be improved.

In the above description, the case when a member who paid a predetermined fee to play a net game was described, but the present invention can be applied in the same way to the case when unspecified users pay a fee using a prepaid card or when a net game can be played free of charge, where the same effect can be received.

In summary, the present invention relates to a server device for net games, which is communicably connected to a plurality of terminal devices used by users via a network for managing a game played in a game space by the users using the terminal devices. The server device of the present invention comprises game watching information transmitting means for transmitting game watching information to watch a game which users to be players play using the terminal devices to the terminal devices of at least two other users to be spectators of the game, and communicating means for receiving a message transmitted from the terminal device of one of the spectators and transmitting the received message to the terminal device of at least one other spectator.

According to the present invention described above, the server device for net games which is communicably connected to a plurality of terminal devices used by users via a network for managing a game played in a game space by the users using the terminal devices, comprises game watching information transmitting means for transmitting game watching information to watch a game which users to be players play using the terminal devices to the terminal devices of at least two other users to be spectators of the game, and communicating means for receiving a message transmitted from the terminal device of one of the spectators and transmitting the received message to the terminal device of at least one other spectator.

In other words, in a net game, game watching information to watch a game which users to be players are playing using the terminal devices is transmitted to the terminal devices of at least two other users to be spectators of this game, so the spectators can receive the transmitted game watching information using the terminal devices, and can watch the game which the users to be players are playing using the terminal devices. Also, a message transmitted from the terminal device of one of the spectators is received, and the received message is transmitted to the terminal device of at least one other spectator, so messages can be exchanged among spectators while watching a game. Since the spectators can exchange opinions and criticisms on the currently watched game as messages, the excitement of watching games based on the interchange of spectators can be given to the spectators. As a result, the excitement of the game by the interchange of spectators who are watching the net game can be provided to the spectators, so the excitement of watching the net game can be improved.

The present invention may further comprise game playing request receiving means for receiving a request to play a game which one spectator sent to another spectator when watching the game, and game playing request confirming means for confirming that the other spectator accepted the request to play a game received by the game playing request receiving means.

According to the above described feature, the server device for net games further comprises game playing request receiving means for receiving a request to play a game which one spectator sent to another spectator when watching the game, and game playing request confirming means for confirming that the other spectator accepted the request to play a game received by the game playing request receiving means.

In other words, a request to play a game which one spectator sent to another spectator is received when watching a game, and the acceptance of the other spectator for the received game playing request is confirmed. Since the spectator can request another spectator whom the spectator is interested in playing a game with by the above exchange of messages, the spectator cannot only watch the game, but can also play the game with another spectator whom the spectator is interested in playing the game. As a result, the spectator can play a game with another spectator whom the former spectator became interested in, so the choices of spectators on how to enjoy a net game can be expanded, and also the game can be played with an opponent whom the spectator wants to play with, so the excitement of the net game can be further improved.

The present invention may have the following feature that the communicating means transmits the received message to the terminal devices of the players.

According to the above described feature, the communicating means transmits the received message to the terminal devices of the players.

In other words, the received message is transmitted to the terminal devices of the players, so the message transmitted from the terminal device of a spectator can be displayed on the terminal devices of the players. Therefore the players can also see the messages exchanged among the spectators, so the enthusiasm of the players to the game can be heightened by the messages, such as cheering from the spectators.

The present invention may further comprise privilege granting means for granting a predetermined privilege to the player according to the degree of cheering from the spectators to the player. As a result, the enthusiasm of the player to the game can be heightened by the messages, such as cheering, from the spectators, so the players can play a heated game, the spectators can watch the heated game, and the excitement of the net game can be further improved for the players and spectators.

Furthermore, the server device may further comprise privilege granting means for granting a predetermined privilege to the player according to the degree of cheering from the spectators to the player.

In other words, a predetermined privilege is given to the player according to the degree of cheering from the spectators to the player. The degree of cheering is, for example, the number of spectators of the game the player is playing and the number of cheering messages from the spectators, and a predetermined privilege is, for example, giving the right to play a net game, or improving the ability parameters of the characters which the player uses for the net game, and in such a case, the enthusiasm of the player to the game can be heightened by giving the above mentioned privileges to the player when the degree of cheering of the spectators reaches a predetermined value or higher, or by increasing the amount of privileges to be given to the player as the degree of the cheering of the spectators increases. As a result, the enthusiasm of the player to the game can be heightened by the messages, such as cheering, from the spectators, so the players can play a heated game, the spectators can watch the heated game, and the excitement of the net game can be further improved for the players and spectators.

Moreover, the present invention also relates to a net game management method using a server device for net games which is communicably connected to a plurality of terminal devices used by users via a network for managing a game played in a game space by the users using the terminal devices, comprising a spectator information transmitting step for the server device for net games to transmit game watching information to watch a game which users to be players play using the terminal devices to the terminal devices of at least two other users to be spectators of the game, and a communicating step for the server device for net games to receive a message transmitted from the terminal device of one of the spectators and to transmit the received message to the terminal device of at least one other spectator.

According to the present invention described in the above, the net game management method using a server device for net games which is communicably connected to a plurality of terminal devices used by users via a network for managing a game played in a game space by the users using the terminal devices, comprises a spectator information transmitting step for the server device for net games to transmit game watching information to watch a game which users to be players play using the terminal devices to the terminal devices of at least two other users to be spectators of the game, and a communicating step for the server device for net games to receive a message transmitted from the terminal device of one of the spectators and to transmit the received message to the terminal device of at least one other spectator.

In other words, the game watching information to watch a game which users to be players play using the terminal devices is transmitted to the terminal devices of at least two other users to be spectators of the game by the server device for net games, so the spectators can receive the transmitted game watching information using the terminal devices, and can watch the game which the users to be players play using the terminal devices. Since a message transmitted from the terminal device of one spectator is received and the received message is transmitted to the terminal device of another spectator, the spectators can exchange messages when watching the game. Since the spectators can exchange opinions and criticisms on the game as messages when watching the game, the excitement of watching the game based on interchange among spectators can be given to the spectators. As a result, the excitement of the game by the interchange of spectators who are watching the net game can be provided to the spectators, so the excitement of watching the net game can be improved.

In addition, the present invention relates to a net game management program providing functions to a server device to a plurality of terminal devices used by users via a network for managing a game played in a game space by the users using the terminal devices, as game watching information transmitting means for transmitting game watching information to watch a game which users to be players play using the terminal devices to the terminal devices of at least two other users to be spectators of the game, and communication means for receiving a message transmitted from the terminal device of one of the spectators and transmitting the received message to the terminal device of at least one other spectator.

According to the present invention described in the above, the net game management program provides functions to a server device to a plurality of terminal devices used by users via a network for managing a game played in a game space by the users using the terminal devices, as game watching information transmitting means for transmitting game watching information to watch a game which users to be players play using the terminal devices to the terminal devices of at least two other users to be spectators of the game, and communication means for receiving a message transmitted from the terminal device of one of the spectators and transmitting the received message to the terminal device of at least one other spectator.

In other words, the game watching information to watch a game which users to be players play using the terminal devices is transmitted to the terminal devices of at least two other users to be spectators of the game by the server device for net games, so the spectators can receive the transmitted game watching information using the terminal devices, and can watch the game which the users to be players play using the terminal devices. Since a message transmitted from the terminal device of one spectator is received and the received message is transmitted to the terminal device of another spectator, the spectators can exchange messages when watching the game. Since the spectators can exchange opinions and criticisms on the game as messages when watching the game, the excitement of watching the game based on interchange among spectators can be given to the spectators. As a result, the excitement of the game by the interchange of spectators who are watching the net game can be provided to the spectators, so the excitement of watching the net game can be improved.

This application is based on Japanese patent application serial no. 2001-162862, filed in Japan Patent Office on May 30, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A server device for net games, which is communicably connected to a plurality of terminal devices used by users via a network, for managing a game played in a game space by the users using said terminal devices, the server device comprising:

game watching information transmitting means for transmitting game watching information to the terminal devices of at least two other users who are spectators of said game to watch a game played by still other users who are game players using other ones of said terminal devices;

communicating means for receiving a message transmitted from the terminal device of one of said spectators and transmitting the received message to the terminal device or at least another one of said spectators;

privilege granting means for granting a predetermined privilege to a game player playing said game according to a degree of cheering based on participation of said spectators who are watching said game being played by said game player, said predetermined privilege including an improvement of an ability parameter wherein:

the game character is controlled by input of said player, said ability parameter is other than a right to play said game, said ability parameter is improved during ongoing playing of the game and is an ability parameter of the game character in the game, and the ability parameter is used in control of the game character in addition to the input of the player during ongoing playing of the game; and said improvement of the ability parameter is effected by said privilege granting means in response to said degree of cheering reaching a predetermined level; and a spectator number determination device which determines a number of spectators who are watching according to a number of spectators to whom the game watching information is transmitted;

wherein said privilege granting means determines the degree of cheering based on the number of said spectators who are watching said game and adjusts the predetermined privilege in accordance with the number of said spectators who are watching said game such that the greater the number of the spectators, the larger the predetermined privilege to be granted to each of said game players.

2. The server device for net games according to claim 1, further comprising:

game playing request receiving means for receiving a request to play a game which one of said spectators sends to another one of said spectators when watching the game; and game playing request confirming means for confirming that the other one of said spectators accepted the request to play a game received by said game playing request receiving means.

3. The server device for net games according to claim 1, wherein said communicating means transmits the received message to the terminal devices of said game players.

4. The server device according to claim 1, wherein said predetermined privilege includes a right to play a net game granted to said player.

5. The server device accord lag to claim 1, wherein said privilege granting means concurrently grants said predetermined privilege adjusted according to said number of said spectators to each of the game players who are competing with each other in the game.

6. The server device according to claim 1, wherein said predetermined privilege includes a right to play the not game for a specific time period which increases according to an increase of the number of said spectators.

7. The server device according to claim 1, wherein the number of spectators varies during a period of time of the game being played by the game players.

8. A net game management method using a server device for net games which is communicably connected to a plurality of terminal devices used by users via a network fox managing a game played in a game space by the users using said terminal devices, said method comprising operating the server to effect the steps of:

transmitting game watching information to terminal devices of at least two ocher users who are spectators of said game to watch a game played by still other users who are game players using other ones of said terminal devices;

communicating messages by receiving a message transmitted from the terminal device of one of said spectators and transmitting the received message to the terminal device of at least another one or said spectators;

granting a predetermined privilege to a game player playing said game according to a degree of cheering based on participation of said spectators who are watching said game being played by said game player, said predetermined privilege including an improvement of an ability parameter wherein:

the game character is controlled by input of said player, said ability parameter is other than a right to play said game, said ability parameter is improved during ongoing playing of the pine and is an ability parameter of the game character in the game, and the ability parameter is used in control of the game character in addition to the input of the player during ongoing playing of the game, and said improvement of the ability parameter is effected by the server in response to said degree of cheering reaching a predetermined level; and determining a number of spectators who are watching according to a number of spectators to whom the game watching information is transmitted;

wherein said granting includes determining the degree of cheering based on the number of said spectators who are watching said game and adjusting the predetermined privilege in accordance with the number of said spectators who are watching said game such that the greater the number of the spectators, the larger the predetermined privilege to be granted to each of said game players.

9. A recording medium which stores an executable net game management program, said net game management program configuring a server device for net games, which is communicably connected to a plurality of terminal devices used by users via a network for managing a game played in a game space by the users using said terminal devices, to function as:

game watching information transmitting means for transmitting game watching information to the terminal devices of at least two other users who are spectators of said game to watch a game played by still other users who are game players using other ones of said terminal devices;

communicating means for receiving a message transmitted from the terminal device of one of said spectators and transmitting the received message to the terminal device of at least another one of said spectators;

privilege granting means for granting a predetermined privilege to a game player playing said game according to a degree of cheering based on participation of said spectators who are watching said game being played by said game player, said predetermined privilege including an improvement of an ability parameter wherein:

the game character is controlled by input of said player, said ability parameter is other than a right to play said game, said ability parameter is improved during ongoing playing of the game and is an ability parameter of the game character in the game, and the ability parameter is used in control of the game character in addition to the input of the player during ongoing playing of the game; and said improvement of the ability parameter is effected by said privilege granting means in response to said degree of cheering reaching a predetermined level; and a spectator number determination device which determines a number of spectators who are watching according to a number of spectators to whom the game watching information is transmitted;

wherein said privilege granting means determines the degree of cheering based on the number of said spectators who are watching said game and adjusts the predetermined privilege in accordance with the number of said spectators who are watching said game such that the greater the number of said spectators the larger the predetermined privilege to be granted to each or said game players.

10. A server device for net games, which is communicably connected to a plurality of terminal devices used by users via a network, for managing a game played in a game space by the users using said terminal devices, the server device comprising:

game watching information transmitting means for transmitting game watching information to the terminal devices of at least two other users who are spectators of said game to watch a game played by still other users who are game players using other ones of said terminal devices;

communicating means for receiving a message transmitted from the terminal device of one of said spectators and transmitting the received message to the terminal device of at least another one of said spectators;

privilege granting means for granting a predetermined privilege to a game player playing said game according to a degree of cheering based on participation of said spectators who are watching said game being played by said game player, said predetermined privilege including an improvement of an ability parameter wherein:

the game character is controlled by input of said player, said ability parameter is other than a right to play said game, said ability parameter is improved during ongoing playing of the game and is an ability parameter of the game character in the game, and the ability parameter is used in control of the game character in addition to the input of the player during ongoing playing of the game; and said improvement of the ability parameter is effected by said privilege granting means in response to said degree of cheering reaching a predetermined level; and a spectator number determination device which determines a number of communicating spectators who are receiving and transmitting messages via the communicating means as a basis for the degree of cheering;

wherein said privilege granting means determines the degree of cheering based on the number of said communicating spectators and adjusts the predetermined privilege in accordance with the number of said communicating spectators such that the greater the number of the communicating spectators, the larger the predetermined privilege to be granted to each of said game players.

11. The server device according to claim 10, wherein said privilege granting means concurrently grants said predetermined privilege adjusted according to said number of communicating spectators to each of the game players who are competing with each other in the game.

* * * * *